July 29, 1952 N. D. PRESTON 2,605,391

CODED TRACK CIRCUIT SIGNALING SYSTEM FOR RAILROADS

Filed June 28, 1946 10 Sheets-Sheet 1

INVENTOR.
Neil D. Preston

CODED TRACK CIRCUIT SIGNALING SYSTEM FOR RAILROADS

Filed June 28, 1946 10 Sheets-Sheet 2

INVENTOR.

Neil D. Preston

CODED TRACK CIRCUIT SIGNALING SYSTEM FOR RAILROADS

Filed June 28, 1946 10 Sheets-Sheet 3

INVENTOR.

Neil D. Preston

CODED TRACK CIRCUIT SIGNALING SYSTEM FOR RAILROADS

Filed June 28, 1946 10 Sheets-Sheet 4

INVENTOR.
Neil D. Preston

July 29, 1952 N. D. PRESTON 2,605,391

CODED TRACK CIRCUIT SIGNALING SYSTEM FOR RAILROADS

Filed June 28, 1946 10 Sheets-Sheet 5

INVENTOR.

Neil D. Preston

CODED TRACK CIRCUIT SIGNALING SYSTEM FOR RAILROADS

Filed June 28, 1946 10 Sheets-Sheet 6

INVENTOR.
*Neil D. Preston*

CODED TRACK CIRCUIT SIGNALING SYSTEM FOR RAILROADS

Filed June 28, 1946 10 Sheets-Sheet 7

INVENTOR.
Neil D. Preston

CODED TRACK CIRCUIT SIGNALING SYSTEM FOR RAILROADS

Filed June 28, 1946 10 Sheets-Sheet 8

INVENTOR.
Neil D. Preston

CODED TRACK CIRCUIT SIGNALING SYSTEM FOR RAILROADS

Filed June 28, 1946 10 Sheets-Sheet 9

INVENTOR.

Neil D. Preston

INVENTOR.

Neil D. Preston

Patented July 29, 1952 2,605,391

UNITED STATES PATENT OFFICE 2,605,391

CODED TRACK CIRCUIT SIGNALING SYSTEM FOR RAILROADS

Neil D. Preston, Rochester, N. Y., assignor to General Railway Signal Company, Rochester, N. Y.

Application June 28, 1946, Serial No. 679,960

39 Claims. (Cl. 246—38)

This invention relates to automatic block signalling systems of the coded track circuit type for multiple track railroads, or similar stretches of track signalled for train movement in one direction only.

In a block signal system for multiple track railroads, where there is only one direction of traffic for each track, and no manual supervisory control to determine traffic movements on that track, the usual practice is to use coded track circuits which are normally and continuously in operation. There are relatively long stretches of track, however, such as between interlocking plants, where the main function of the coded track circuits is to detect occupancy and govern the indications of the block signals as trains enter and pass through such stretch in one direction. In order that the coded track circuits for such a stretch may perform these functions, it is not necessary that they be constantly operating when no trains are present; and it is sufficient to provide proper signal indications for train movement through the stretch, if an appropriate number of these track circuits are set into operation ahead of each train as it passes through the stretch.

It can be readily appreciated that since a given block is occupied by a train only a very small part of the time, there would be a very substantial saving in the wear and tear upon the moving parts and contacts of the coding equipment, and an advantageous prolongation of the useful life of such equipment, if the coded track circuits are normally inactive, and coding operation does not occur until required for a train movement. If the coded track circuits are entirely deenergized, as well as inactive, until automatically started by an approaching train, there is the further advantageous saving in the energy that would otherwise be required to energize the track rails and certain parts of the coding apparatus, this energy saving being particularly of value when primary batteries are used, or the power supply for trickle charging of storage batteries has a limited capacity or is subject to rather frequent interruptions. In this connection, since coded track circuit apparatus is designed to be operated by intermittent code pulses having substantially equal "on" and "off" intervals, a coded track circuit which is steadily energized and inactive will ordinarily demand more power for track rail excitation than a constantly coded track circuit, because the energy for coding operation is supplied to the track rails, ballast and track relay a smaller part of the time than when the track circuit is steadily energized.

With these considerations in mind, it is proposed in accordance with this invention to provide a coded track circuit system for multiple track railroads in which the coded track circuits are normally deenergized, as well as inactive, and are automatically set into operation by an approach starting control for an appropriate number of blocks ahead of a train as it moves through the stretch, and are also automatically restored to the normal condition behind such train. In this proposed system, the automatic approach starting control for a limited number of blocks ahead is initiated by a suitable manual control or train occupancy of normally energized or coded track circuits, at interlocking plants, and other entrance points where a train may come into the stretch of track or territory equipped in accordance with this invention. After a train has come into the equipped territory at such an entrance point, its presence as it advances automatically creates an approach starting control to initiate coding operation in an appropriate number of blocks ahead of this train to provide a clear or unrestricted signal indication to permit the train to run at speed if traffic conditions permit. Also, as a train in the equipped stretch passes out of each block, in which coding operation has been started, this train movement tends to restore the coded track circuit of that block to its normally deenergized condition, and will do so unless there is some following train near enough to maintain coding operation by its approach starting control.

The primary object of this invention is to provide a system of this type, in which the functions of automatic approach starting and shut down of coded track circuits for multiple track railroads are performed by conventional apparatus and circuits in a simple and reliable manner, and with a limited number of additional relays and circuits, as compared with a system having constantly operating coded track circuits.

A further object of this invention is to provide simple and effective means for emergency starting of the coding operation in systems of this type, as may be required under special conditions where the regular approach starting control from an entrance point is not effective for some reason, such as due to the out-of-order condition of some one track circuit, in the manner and for the reasons more conveniently discussed later.

Generally speaking, for the purpose of explanation and without attempting to define the exact nature and scope of the invention, the organization comprises code transmitting and receiving means of the usual type arranged to perform additional functions for approach starting and automatic shut down of the coded track circuits. For approach starting control to establish coding operation in a block, driven code pulses of a predetermined rate are transmitted from the entrance end to the exit end of the block, and the reception of this starting driven code starts up the code oscillators at the exit end, and causes transmission of a regular signal controlling driven code at the caution code rate. When coding operation has thus been established in a block, the starting driven code is changed to the usual type of inverse code pulses occurring during the "off" intervals between the driven code being received; and this inverse code maintains coding operation in the block, and also permits the rate of the regular signal controlling driven code to be changed when the approach starting control is extended to the next block ahead. The approach starting control by a driven code reaching ahead is passed from one block to the next when the existing inverse code is discontinued by a tumble-down of the inverse code in blocks in the rear. When coding operation has been started in enough blocks ahead of an entrance point or a train in the stretch to provide the highest code rate and most favorable signal indication for the train, the tumble-down control of the inverse code and the extension of the approach starting control ceases, until the train has advanced to a point calling for coding operation in an additional block to provide the highest code rate and a clear signal ahead for the train. The cessation of the inverse code in a block having its coding operation just established acts to actuate a code sending device, which maintains transmission of the signal control driven code for that block, independently of an inverse code, until a train passes through this block and its code sending device is automatically restored to its normal condition to leave the track circuit deenergized.

Various other characteristic features, attributes and advantages of the organization constituting this invention will be in part apparent, and in part pointed out as certain specific embodiments of the invention are hereinafter described.

In the accompanying drawings, which illustrate certain specific embodiments of the invention, the parts and circuits have been illustrated diagrammatically and conventionally, more with the view of facilitating an explanation and understanding of the invention, then to illustrate in detail the particular construction and arrangement of parts preferably employed in practice. These drawings also include for explanatory purposes certain sequence diagrams or charts to illustrate the general time sequence of relay operations for typical operations of the system.

In these drawings, in order to simplify the illustration of the circuits, the connections to the opposite terminals of a battery or other suitable source of current for energizing the local relay circuits have been represented by the symbols (+) and (−) associated with arrows suggesting flow of current into and out of the electrical connections shown. Also, various relays and their contacts have been shown in a conventional manner. Briefly, the contact fingers belonging to a given relay are located either above or below the representation of the coil or winding of the relay as most convenient for showing of the circuit connections; and it is assumed that, when a relay is energized, its contact fingers, indicated as associated with that relay by dotted lines, are moved from a lower or inclined position to a horizontal or raised position. Various other diagrammatic and conventional showings on the drawings will be explained as the description progresses.

In the accompanying drawings, Figs. 1A to 1C, when arranged end to end, illustrate the system of this invention applied to a series of four consecutive blocks adjacent an entrance point.

Figs. 2A to 2F inclusive are explanatory charts or diagrams illustrating schematically certain conditions of train position and sequence of relay actuation for typical operations of the system in connection with the series of blocks shown in Figs. 1A to 1C.

Figure 1A:
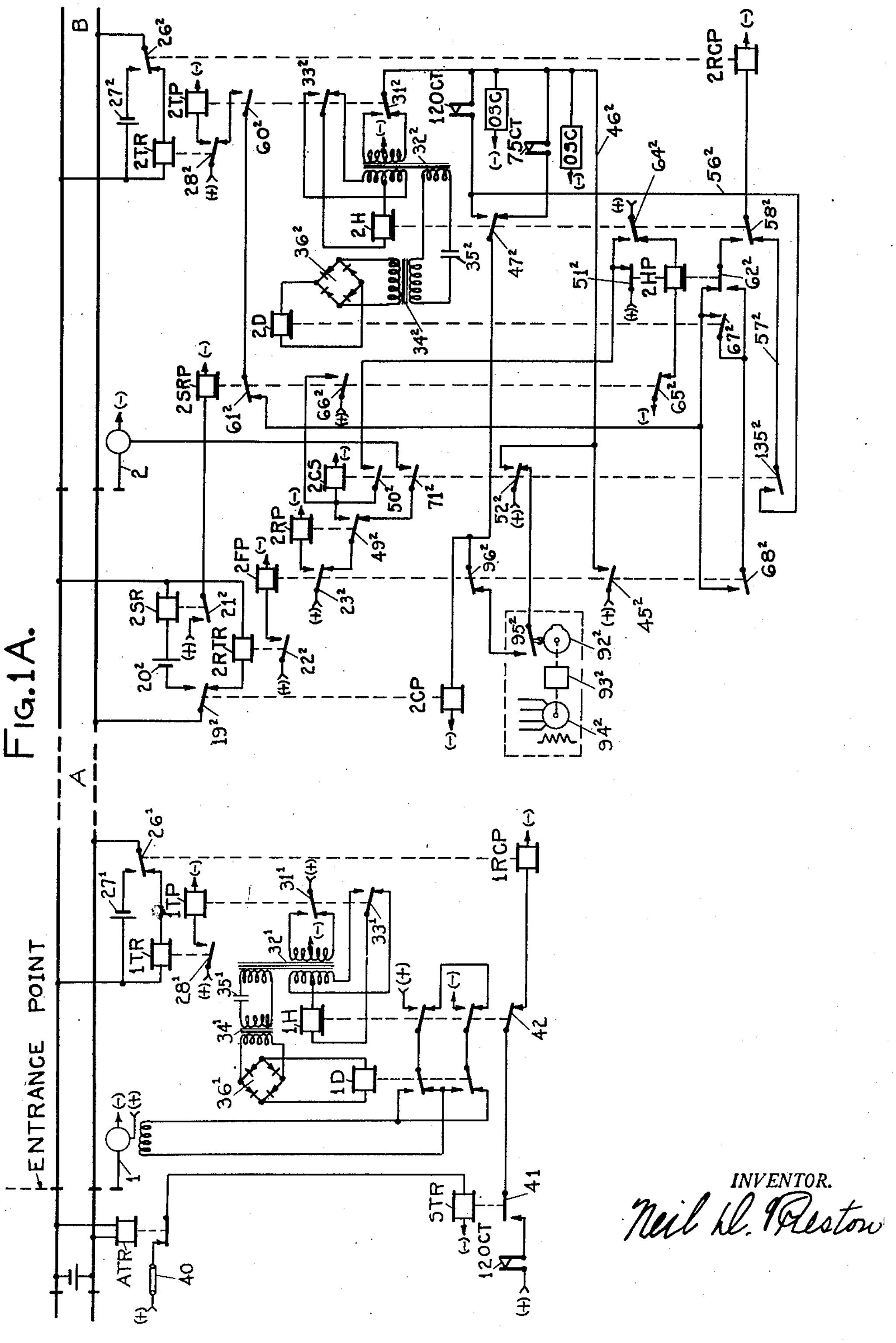

As previously noted, the system of this invention is designed for automatically starting and stopping the operation of normally deenergized coded track circuits of an automatic block signal system for multiple track railroads, or like stretches of track signalled for train movement in one direction, and having no supervisory manual control for determining the movement of traffic and for initiating coding operation as required. Such a stretch of track is divided into a series of consecutive blocks of appropriate length for the kind of traffic and number of signal indications employed in accordance with the usual practice. It is assumed for the specific arrangements shown that each of these blocks will include only one coded track circuit; but it should be understood that the invention may be applied where cut sections are used in the block by providing suitable and well known means for relaying or repeating driven and inverse code pulses at such cut sections, so that the controlling effect of such pulses extends the full length of the block.

It is also assumed that each block is provided with a suitable wayside signal at its entrance end, capable of displaying the different desired signal indications in response to the operation of the associated code receiving apparatus at different code rates; but it should be understood that the system of this invention is applicable to stretches of track equipped in a well known manner for cab signalling or automatic train control, with or without wayside signals. The signals shown conventionally may be of any suitable type of semaphore or color light signal, with the indications governed by code responsive relays energized by different code rates by any one of the well known signal control circuits. For example, the signal shown may be color light signals of the searchlight type such as disclosed in the patent to O. S. Field, No. 1,835,150, December 8, 1931. In the form of the invention illustrated in Figs. 1A to 3A, where the signal is intended to provide for three distinctive indications of green for clear, yellow for caution, and red for a permissive stop, the operating winding of the searchlight type signal is controlled by the energization of a home relay H and a distant relay D in the usual manner by well known circuits, such as illustrated for example in Fig. 1A for signal 1.

The coded track circuit and associated apparatus is the same for each block and signal location in the equipped stretch, except that certain relays and circuits are not required and are preferably omitted for the signal location 1 of the first block A at an entrance point to the equipped stretch. In view of this duplication of like parts and circuits for the different signal locations, it is convenient to use the same letters to designate like relays associated with the different signal locations with a prefix number corresponding with the number of the signal, and to employ the same reference numbers with distinctive exponents corresponding with the signal number to designate like contacts and wiring connections for the different signal locations. A description of the apparatus and circuits associated with the signal locations at the opposite ends of one typical block will serve to explain the nature of the coding equipment for the various blocks and the intercontrol between the coded track circuits for adjacent blocks.

Figure 1B:
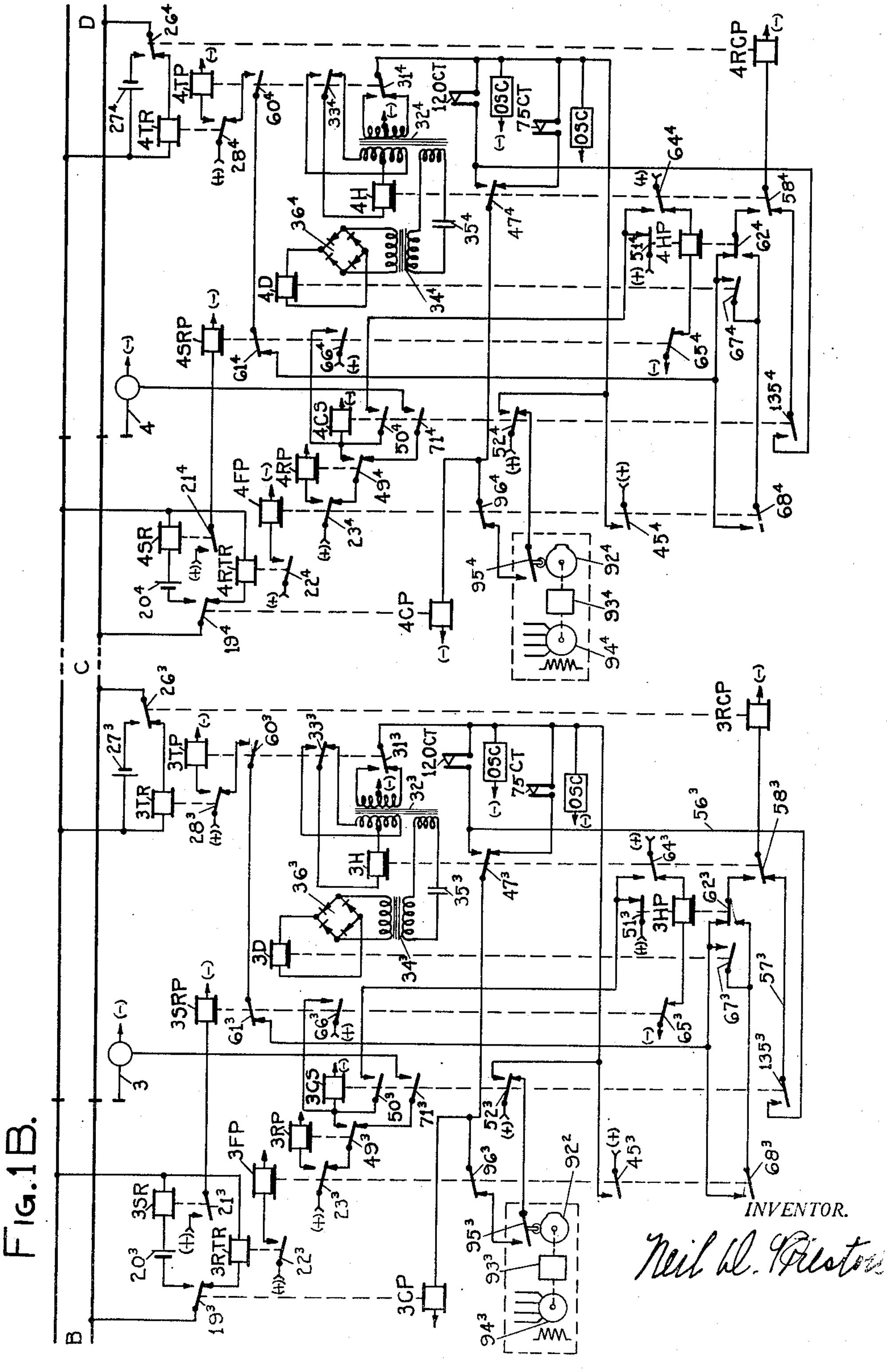

Referring to Fig. 1B a coded track circuit for the typical block C between location of signals 3 and 4 comprises a driven code transmitter relay 4CP at the exit end adapted to be intermittently energized at different selected code rates, assumed to be 75 and 120 code pulses per minute, by the closure of coding contacts 75CT and 120CT indicated conventionally and operated by code oscillators of the usual type, such as disclosed, for example, in the patent to O. S. Field, No. 2,351,588, June 20, 1944. This transmitter relay 4CP, when deenergized as shown, connects through its back contact $19^4$ an inverse code following track relay 4RTR across the track rails of the block C by obvious circuit connections and when energized connects through its front contact $19^4$ a track battery $20^4$ or equivalent source of current, to the track rails in series with a series relay 4SR of the usual type, so that this series relay 4SR will be energized each time the transmiter relay 4CP is energized, provided there is a train in the block near enough to the exit end to cause pick-up current to flow through this series relay 4SR. The intermittent energization of the series relay 4SR in response to the presence of a train and the intermittent closure of its front contacts $21^4$ maintains energized a slow release repeater relay 4SRP by a circuit readily traced on the drawings.

The intermittent operation of the inverse code track relay 4RTR, in response to a starting driven code or an inverse code under conditions later described, and the intermittent closure of its front contact $22^4$ maintains energized a slow-release front contact repeater relay 4FP which in turn energizes through its front contact $23^4$ another slightly slow release repeater relay 4RP. These relays 4FP and 4RP govern the energization of a code sending stick relay 4CS under conditions and for the purpose more conveniently considered later in describing the operation of the system.

At the entrance end of the typical block C an inverse code transmitter 3RCP, when deenergized as shown, connects through its back contact $26^3$ a code following track relay 3TR across the track rails, and when energized connects through its front contact $26^3$ a battery $27^3$ or equivalent source of current, to the track rails to provide starting driven code or inverse code pulses at times and under the conditions later described. A front contact $28^3$ of the code following track relay 3TR energizes a quick acting repeater relay 3TP; and these two relays 3TR and 3TP cooperate to provide inverse code pulses.

The repeater relay 3TP also governs the energization of a slow release home and distant relays 3H and 3D by means of suitable decoding apparatus of any one of the well known forms. In the specific arrangement shown, the repeater relay 3TP governs through its front and back contacts $31^3$ the energization of the two halves of the primary of a decoding transformer $32^3$ having a midtap connection; and the two halves of a secondary of this transformer are connected through front and back contacts $33^3$ of the relay 3TP to the home relay 3H, so that this home relay 3H is energized when the repeater relay 3TP is intermittently operated at any code rate. Another secondary of this decoding transformer is connected to a coupling transformer $34^3$ by a circuit tuned by a condenser $35^3$ for resonance at the clear code rate, assumed to be 120 pulses per minute, so that when the repeater relay 3TP is intermittently operated at this code rate, maximum current flows through the primary of the coupling transformer. The secondary of this coupling transformer $34^3$ is connected by a full-wave rectifier $36^3$ of the usual type to the distant relay 3D.

The apparatus at the typical signal location 3 also includes a timing or slow-release relay 3HP, and control circuits for the oscillators and transmitter relays 3CP and 3RCP which are more conveniently considered later in describing the operation.

The various relays are of the usual type commonly used for corresponding purposes in coded track circuit organizations; and while these relays have been illustrated conventionally as being of the ordinary neutral type, it should be understood that these relays may be structurally different in practice as best adapted for their particular purpose. For example, it is contemplated that the code following track relays TR and RTR will be of the low resistance quick-acting biased polar type, and that the track batteries on opposite sides of the insulated joints at a signal location will be connected to the track rails with opposite polarity to provide protection against faulty signal operation in the event of failure of the insulated joints, in accordance with well-known practice. Similarly, the transmitter relays CP and RCP may be of the biased polar type, and the series relay SR will have a structure suited to its function. The relays, such as FP, RP, SRP, HD, D and HP, indicated conventionally as being slow-releasing, are assumed to be provided with copper slugs or have equivalent structures to delay the retraction of the armature of the relay after deenergization of its operating winding for the appropriate time interval.

*Operation*

In explaining the contemplated mode of operation of the specific embodiments of the invention shown, it is convenient to consider the operation of the different embodiments separately with respect to different conditions. Among other things, it is convenient to consider first how coding operation for the appropriate number of blocks is initiated at an entrance point to the equipped stretch and then explain the operation of the system as a train travels through the equipped stretch.

In describing these typical operations, it is convenient to refer to the diagram or charts of Figs. 2A to 2F, 3A and 3B, and 8A to 8F, which illustrate conventionally and schematically the time of actuation of certain parts for typical operations of the system. These diagrams are not intended to indicate the operation of all relays, such as the code transmitter relays, track relays and the like, but only those relays of significance in the sequence of operation involved in the automatic start and restoration of normally deenergized track circuits. Also, these diagrams are not intended to show the exact operating times for the particular relays, but merely to indicate for explanatory purposes a general timing relationship and sequence of relay operation. Certain arbitrary symbols are used in these diagrams to represent driven codes, inverse codes, beat codes and the like, but the significance of these symbols can be readily understood as these diagrams are considered in connection with the description of the operation.

*Starting at an entrance point.*—In the type of system contemplated, a train may enter the stretch of track equipped in accordance with this invention at some point, conveniently termed an entrance point, which may be at some interlocking plant at the ends of the equipped stretch, or at some manually outlying switch or crossover at some intermediate location in the stretch. In either case, the train must occupy some approach section of track, or there will be some manual actuation of a lever, switch, or the like; and either or both of these conditions may be utilized to provide automatic starting of the coded track circuits of the equipped stretch. In the case of the entrance of a train into the equipped stretch at an interlocking plant, which is the more common situation, it is contemplated that there will be some manual actuation of a circuit controller in connection with setting up a route for a train to enter the stretch, or governing the clearing of the head-block signal for a train to move into the equipped stretch, and that the operation of such a circuit controller, indicated conventionally at 40, will serve to deenergize a starting relay STR to initiate approach starting control. In the case of an outlying switch or crossover, operation of this switch may involve the actuation of a circuit controller such as 40 to deenergize a start relay STR. Also, a track circuit section or sections of the appropriate length, provided with steady energized track circuits of the usual type, or with constantly operating coded track circuits, may be employed to deenergize the start relay STR by the operation of a track relay, such as the track relay ATR shown, when a train comes within predescribed limits of the entrance point, and it is expedient to start coding operation in the equipped territory.

Figures 2A, 2B, 2C:
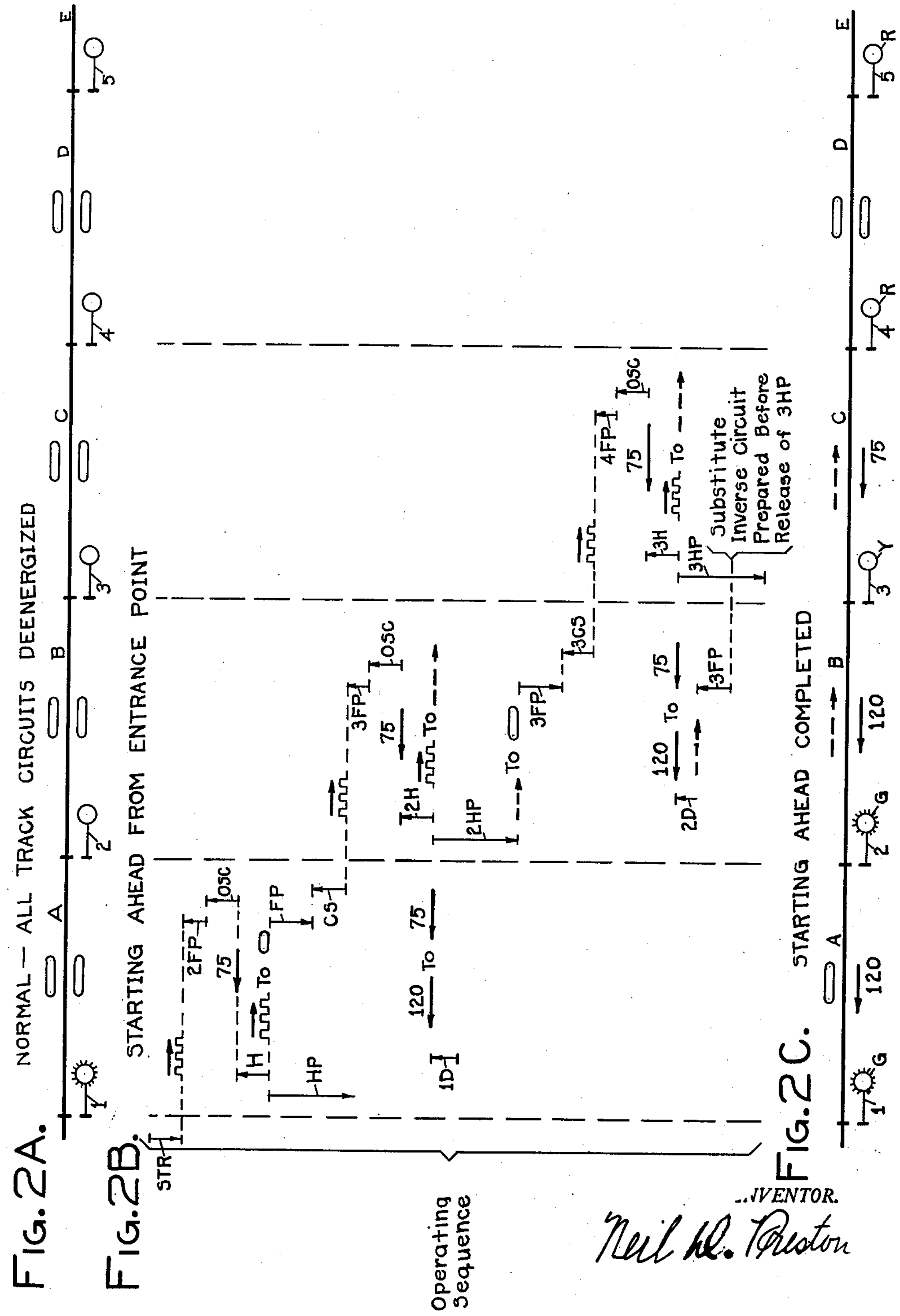

Referring to Fig. 1A, and assuming that the start relay STR is deenergized at the time and under the conditions explained for the purpose of starting up coding operation in the equipped stretch, the track circuits for the three blocks in advance of the entrance point are automatically changed from the normal condition of a complete deenergization indicated in the diagram of Fig. 2A to a condition of coding indicated in the diagram of Fig. 2C by a sequence of operation shown schematically for explanatory purposes in the sequence chart of Fig. 2B.

Considering this operation and the circuits involved in detail, the release of the start relay STR closes at its back contact 41 a circuit for operating the inverse code transmitter relay 1RCP at the 120 code rate by the operation of a code oscillator, which may be constantly operated or set into operation by the release of relay STR, as desired. This circuit for the energization of the transmitter relay 1RCP may be readily traced from (+), oscillator contacts 120CT, back contact 41 of relay STR, back contact 42 of relay 1H, relay 1RCP, to (−).

The transmission of 120 driven code pulses toward the exit end of the block A, as indicated by the saw-tooth symbol in the sequence diagram of Fig. 2B, intermittently energizes the track relay 2RTR, thereby closing its front contact $22^2$ intermittently to pick up and maintain energized the slow release relay 2FP over an obvious circuit. The energization of relay 2FP and closure of its front contact $45^2$ supplies current over wire $46^2$ to the operating windings of the code oscillators to initiate their operation, and also to the coding contacts 75CT, 120CT of these oscillators. Under the conditions assumed, relay 2H is deenergized, and the transmitter relay 2CP is connected through the back contact $47^2$ of relay 2H to the contacts 75CT of the code oscillator operating at the 75 code rate.

Under these conditions, the transmitter relay 1RCP at the entrance end of the block A is being operated for a time at the 120 code rate, while the transmitter relay 2CP at the exit end is being operated at the 75 code rate. Since these code rates are different, there are times when the track relay 1TR at the entrance end of the block is connected to the track rails while the transmitter relay 2CP at the exit end of that block is connecting the track battery to the track rails. Consequently, there is an intermittent operation of the code following track relay 1TR and closure of its front contact $28^1$ to intermittently energize its repeater relay 1TP, thereby in time energizing the home relay 1H to open its back contact 42 and discontinue further operation of the inverse code transmitter relay 1RCP.

Thus, as indicated in the sequence chart of Fig. 2B, the energization of the relay 1H changes the starting 120 driven code to zero, whereupon the relay 2FP at the exit end of the block A releases. The prior energization of relay 2FP has established an obvious circuit through its front contact $23^2$ to energize its repeater relay 2RP; and when the relay 2FP is released, and prior to the release of its repeater relay 2RP, a pick-up circuit for the code sending relay 2CS is momentarily established from (+), through back contact $23^2$ of relay 2FP, front contact $49^2$ of relay 2RP, winding of relay 2CS, to (−).

The code sending relay 2CS, thus momentarily energized, is maintained energized by a stick circuit including its front contact $50^2$ and a front contact $51^2$ of the normally energized slow release repeater relay 2HP.

The energization of the code sending relay 2CS closes a front contact $52^2$ to continue the supply of energy to the code oscillators 0SC and their coding contacts 75CT and 120CT to maintain transmission of the signal control driven code. Since the relay 2CS is quickly energized upon the release of relay 2FP, there is no material interruption in the supply of current to the code oscillators and their contacts.

The energization of the code sending relay 2CS also performs another important function by closing its front contact 135[2] to establish a circuit for operating the inverse code transmitter relay 2RCP for the next block B in advance at the 120 code rate, this circuit being from (+), front contact 52[2] of relay 2CS, contacts 120CT of the 120 code oscillator OSC, wire 56[2], front contact 135[2] of relay 2CS, wire 57[2], back contact 58[2] of relay 2H, and transmitter relay 2RCP, to (−).

The resultant transmission of the driven starting code in the block B energizes the relay 3FP and starts the code oscillators OSC at the signal location 3 to transmit back to the signal location 2 a driven code of the 75 code rate by circuits and operation the same as described for relay 2FP. This causes energization of the relay 2H, which opens its back contact 58[2] to disconnect the transmitter relay 2RCP from the 120 code oscillator contacts and establish through the front contact of the same finger 58[2] of relay 2H immediately a circuit for operating this transmitter relay 2RCP to provide inverse code pulses.

This inverse code operating circuit for transmitter relay 2RCP may be traced from (+), through back contact 28[2] of the code following track relay 2TR, front contact 60[2] of its repeater relay 2TP, back contact 61[2] of relay 2SRP, front contact 62[2] of relay 2HP, front contact 58[2] of relay 2H, and relay 2RCP, to (−).

In connection with this circuit, it can be seen that each time the code following track relay 2TR of block B releases at the end of the driven code pulse, this circuit is momentarily established until the repeater relay 2TP releases and opens it front contact 60[2], thereby momentarily energizing the transmitter relay 2RCP to provide an inverse code pulse of a duration measured by the release time of the relays 2TP and 2RCP. Any other suitable arrangement for providing inverse code pulses may be employed.

The energization of the relay 2H closes its front contact 47[2] to change the code rate in the block A from 75 to 120; but in the particular operation under consideration at an entrance point, this change in code rate has no effect other than to pick up relay 1D and change the indication of signal 1 from yellow to green. Also, the energization of relay 2H opens its back contact 64[2] to open the obvious energizing circuit for the slow release repeater relay 2HP, including back contact 65[2] of series repeater relay 2SRP, thereby initiating timing operation of relay 2HP. After the release time for relay 2HP has expired, its front contact 62[2] opens the inverse code operating circuit above described; and since neither of the relays 2FP nor 2D is energized under the conditions now under consideration, the inverse code in block B is changed to zero.

This cessation of inverse code in the block B releases the inverse code responsive relay 3FP and causes energization of the code sending relay 3CS in the same manner previously described for the code sending relay 2CS. This in turn applies a starting driven code to the next block C to start the code oscillators OSC at the end of this block and bring back a 75 driven code in the same manner as described for block B. The energization of the relay 3H by this driven code changes the starting driven code to an inverse code, and also performs two other functions. First, the energization of the relay 3H operates its contacts 47[3] to change the code rate in the block B next in the rear from 75 to 120 which energizes the relay 2D at the signal location 2, closing its front contact 67[2] and completing an inverse code operating circuit through the back contact 62[2] of the associated relay 2HP and front contact 58[2] of relay 2H, as can be readily seen without tracing the circuits in detail. This inverse code in the block B picks up the inverse code responsive relay 3FP at signal location 3 to close its front contact 68[3] to prepare an inverse code operating circuit for the transmitter relay 3RCP upon release of the relay 3HP. Consequently, upon release of relay 3HP, front contact 68[3] of relay 3FP is closed, and transmission of inverse code in block C is maintained by a circuit from (+), back contact 28[3] of relay 3TR, front contact 60[3] of relay 3TP, back contact 61[3] of relay 3SRP, front contact 68[3] of relay 3FP, back contact 62[3] of relay 3HP, front contact 58[3] of relay 3H, transmitter relay 3RCP, to (−).

The relay 3HP, and a similar relay at each of the signal locations, is made sufficiently slow releasing, as suggested in the sequence diagram of Fig. 2B, to span over the time required after energization of relay 3H to change code rate in the block in the rear, energize the relay 2D, establish inverse code, and energize relay 3FP.

Briefly summarizing the operation above explained in detail, it will be noted that the starting driven code of the 120 code rate is transmitted from the entrance end of the first block A to the exit end of that block to energize relay 2FP, starting the oscillators, and causing operation of the transmitter code relay 2CP at the 75 caution code rate.

Since the transmitter relays 1RCP and 2CP at the opposite ends of this block A are being intermittently energized at different code rates, there are intervals during the transmission of driven code pulses in opposite directions, conveniently termed a beat code condition, during which the code following track relays 1TR and 2RTR both receive current pulses. In this connection, if desired, the energizing circuit for the transmitter relay 2CP and 1RCP may include a back contact of the associated inverse code track relays 1TR and 2RTR, in the manner disclosed in my prior Patent No. 2,350,639, June 6, 1944, to provide what may be termed a back contact check to assure transmission of code pulses alternately in opposite directions.

The intermittent operation of the track relay 1TR at the entrance end of the block and its repeater relay 1TP causes energization of the 1H relay after a few code pulses have been received at this entrance end; and the energization of this relay 1H discontinues the starting driven code. This results in the energization of the code sending relay 2CS at the exit end of this first block A to close its front contact 35[2] to transmit a starting driven code in the next block B, whereupon the oscillators at the exit end of this next block are set into operation and a caution driven code is transmitted to change the starting driven code to an inverse code, and also increase the code rate in the block A in the rear. When the relay 2HP releases after a time interval, the inverse code in this second block B is cut off, since there is no following inverse code, and the approach starting control is extended to the next or third block where the same operation occurs.

When coding has been established in the third block C, however, and the code rate of the signal controlling driven code has been changed to the clear 120 code in the next block B in the rear, the energization of the relay 2D for this block B and closure of its front contact $67^2$ establishes an inverse code in this block B, so that by the time the relay 3HP for the third block C releases, an inverse code exists in the next block B in the rear to energize relay 3FP and close its contact $68^3$ and maintain the inverse code in this third block C, thereby arresting or discontinuing for the time being the approach starting control.

*Extending the approach starting control ahead of a train.*—Considering now the operation where a train enters and moves through the equipped stretch, the approach starting is automatically extended block by block as this train advances; and since this operation is the same for the whole series of blocks, it will be sufficient to explain how the approach starting control is automatically extended for one additional block D beyond the entrance point.

When a train passes the first signal 1 at the entrance point in Fig. 1A, there is no inverse code in this block A, and nothing happens until the train has progressed in block A to the point where the series relay 2SR at the exit end of this block A is energized. Of course, if the block A is short and the adjustment of the series relay 2SR makes it sufficiently sensitive, this energization of this series relay 2SR may occur as soon as the train passes the signal; but for ordinary length of blocks and operating conditions, it may be assumed that the series relay 2SR will not be energized until the train has advanced to a point, such as 2000 feet or so from the exit end of the block.

The intermittent energization of the relay 2SR due to the presence of a train and the resultant sustained energization of its repeater relay 2SRP opens at its back contact $61^2$ the circuit then providing inverse code in the next block B ahead. Cessation of the inverse code in this block B, and the release of the front contact repeater relay 3FP at the exit end of that block B opens contact $68^3$ of this relay 3FP to interrupt the circuit then providing inverse code in the next block C ahead. The cessation of the inverse code in this next or third block C, then operating at the 75 code rate, causes energization of the code sending relay 4CS at the exit end of this block C, thereby closing its front contact $135^4$ and applying the starting driven code to the next block D ahead. The coding operation in this next block D ahead, i. e. the third block ahead of the one occupied by the train, changes the code rate in the next block C in the rear from the 75 caution code to the 120 clear code to close front contact $67^3$ of relay 3D and resume transmission of an inverse code in this block C to energize relay 4FP at its exit end to close its front contact $68^4$ before relay 4HP for the block D just started in operation has time to release.

Consequently, the inverse code existing in the third block D ahead of the one occupied by the train, which is initially established when coding operation is started in this block, is maintained by the presence of inverse code in the next block C in the rear, after relay 4HP has released, due to the fact that the code rates have been changed to provide a clear signal at the entrance to the second block C ahead of the block A occupied by the train.

Figure 2D:
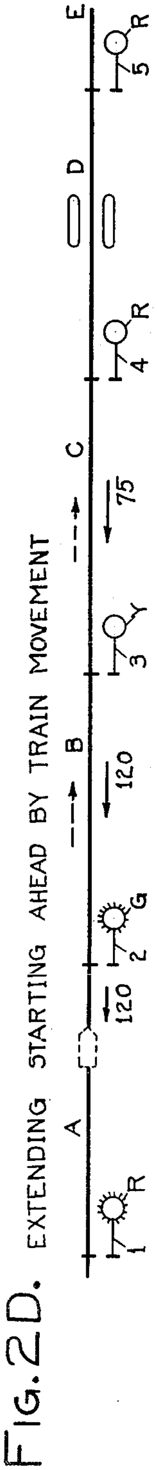
Figure 2E:
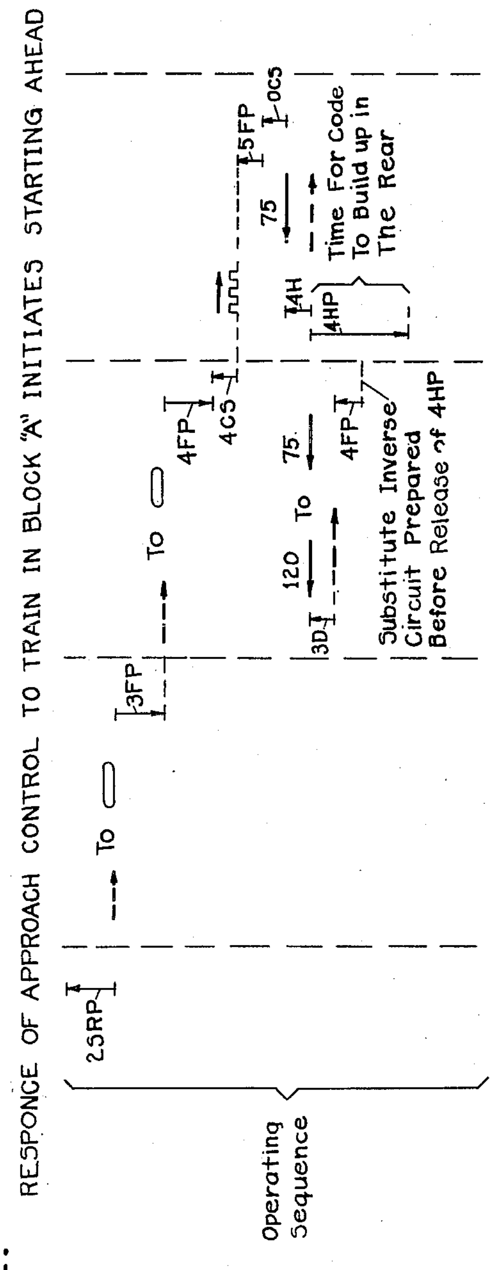
Figure 2F:
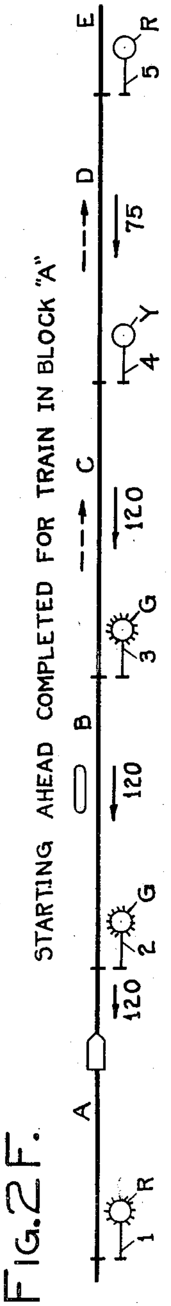

Thus, after the train under consideration has reached the point indicated in Fig. 2D, where the series relay 2SRP is energized, a sequence of relay operation indicated in Fig. 2E occurs to extend the coding operation for one additional block D to give the signal indications indicated in Fig. 2F.

As this train advances and enters the block B, there is no inverse code in this block, and no further operation of the system occurs until the series relay 3SRP at the end of this block is energized, whereupon the existing inverse code in block C is cut off to stop the inverse code in the block D and energize the code sending relay 5CS for the east end of this block, thereby transmitting a starting driven code in the next block E in advance (only partially shown) to increase the code rate in block D in the same manner. In other words, as the train moves through the equipped stretch of track, the approach starting control is automatically extended from block to block ahead of that train to provide the appropriate signal indications.

Since the extension or reach ahead of the approach starting control is initiated by the energization of a series relay, such as 2SR, before a train passes the next signal ahead, as indicated in Fig. 2D, the starting operation will be completed to change the indications of the signals ahead, as indicated in Fig. 2F, before the train passes the next signal 2 ahead. Consequently, the engineer of a train will not see the next signal 2 ahead change from a restricted indication to a clear indication due to the approach starting control of the system.

*Approach lighting.*—If color light signals are used, as has been assumed, it is desirable to make provision for lighting these color light signals only when necessary to provide an indication for an approaching train. The usual arrangement of employing an inverse code to govern the approach lighting of the signals is not applicable, however, to the system of this invention, because the coded track circuits are normally inactive and there is no inverse code to extinguish the signals under such normal conditions. Although the system of this invention includes a series relay SR, which may be used if desired for approach lighting control of the signals in the well known manner, it is considered desirable to provide at least full block approach lighting of the signals, so that the engineman of a train will have no uncertainty about the lighting of the signal next ahead and the possible necessity of treating such signal as a dark or stop signal, if it should fail to light.

In the system of this invention, when coding has been established automatically by the approach of a train, and when a signal should be lighted for a train which has passed the next signal in the rear, the code sending relay, such as 2CS, associated with the signal 2 is energized; and the desired approach lighting of the signal 2 may be accomplished by including a front contact $71^2$ of such code sending relay 2CS in the lighting circuit of the signal 2 as diagrammatically illustrated in Fig. 1A. Since the code sending relays, such as 2CS, are deenergized when the system is in its normal inactive condition, the signals are not lighted under such condition, but only when coding operation has been started by an approaching train.

Such control of the approach lighting circuits for the signals by the energization of the associated code sending relay, such as 2CS, would cause lighting of three signals ahead of a train, such as signals 2, 3 and 4 in Fig. 2F, since the code sending relays associated with these signals are energized. Although such control affords the desired economy in lighting current for signals, which is the primary purpose of approach lighting, a control by inverse code may also be employed, if desired and as shown, by including in the signal lighting circuit back contacts $23^2$ and $49^2$ of the relays 2FP and 2RP, as illustrated for the typical signal location in Fig. 1A. This limits the approach lighting to the two signals ahead of the train, such as the signals 2 and 3 in Fig. 2F, when the train reaches the position indicated in this Fig. 2F to energize the series relay 2SR and its repeater 2SRP. When a train first enters a block, such as the block B in Fig. 2F, only one signal 3 ahead is lighted. In other words, with the approach lighting arrangement shown, sometimes one and sometimes two signals ahead of a train are lighted; but each signal is lighted by the time the train passes the signal next in the rear, thereby affording the desired full block approach light in all cases.

It may be explained in this connection that the inverse code in each block is arranged to be cut off by the energization of the series relay repeater for the block next in the rear, such as the relay 2SRP opening at its back contact $61^2$ the inverse code operating circuit for the block B, in order that a change in signal indication due to extension of the approach starting control will occur at the exit end of such block before the train passes the next signal in the rear at the entrance end of that block. In other words, an engineman does not see a change in the indication of the first signal ahead due to the approach starting control operation. This is considered to be desirable and advantageous; but if such control by a series repeater relay 2SRP should be omitted, the approach lighting of signals will be limited to the one signal ahead of the train.

Figure 3A:
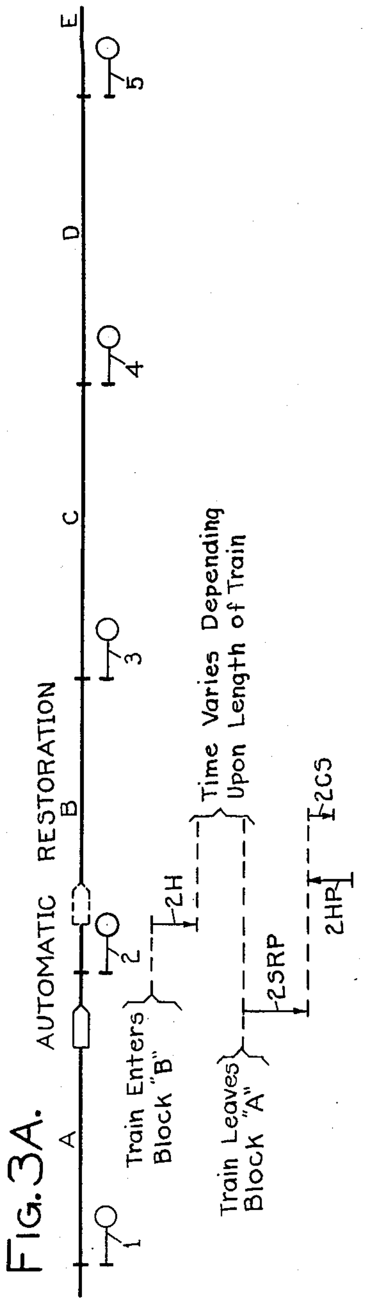
Figs. 3A and 3B are fragmentary diagrams indicating the sequence of relay operation involved in the automatic restoration and emergency start functions of the system.
Figure 3B:
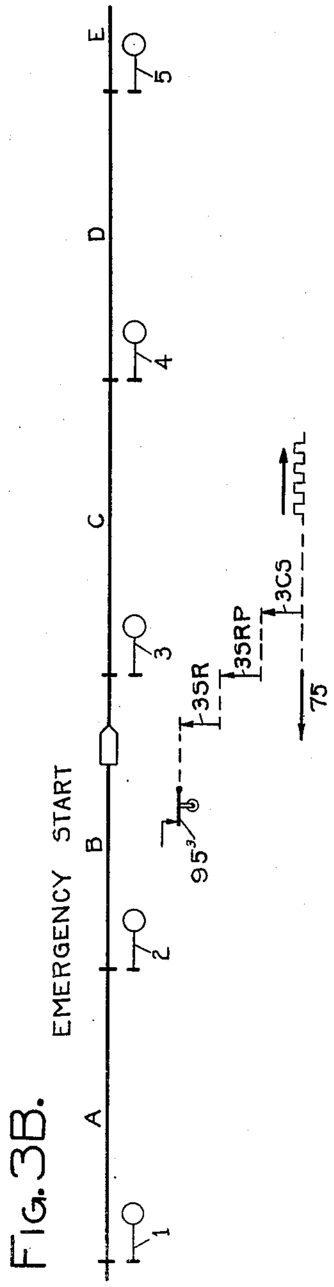

*Automatic restoration to normal.*—Referring to Fig. 1A, and assuming that a train in the block A has established coding ahead of it as shown in the diagram of Fig. 2F, the code sending relay 2CS, providing driven code pulses ahead of this train and available for cab signal purposes if desired, is automatically released when this train passes out of the block A by a sequence of relay operation indicated in the diagram of Fig. 3A.

When the front end of the train passes into the next block B, coding operation of the track relay 2TR is stopped and the home relay 2H releases in the usual way. This opens at the front contact $64^2$ of relay 2H the stick circuit for the relay 2CS; but since the series repeater relay 2SRP is energized under these conditions, assuming a train of ordinary length, the relay 2CS is maintained energized by its pick-up circuit through the front contact $66^2$ of relay 2SRP. Also, the slow release relay 2HP remains deenergized after the release of the relay 2H, due to the open back contact $65^2$ of the relay 2SRP.

When the train in question passes entirely out of the block A, the series repeater relay 2SRP releases and opens its front contact $66^2$ to release the code sending relay 2CS, which is quick acting and will open its front stick contact $50^2$ before the relay 2HP picks up to close its front contact $51^2$. The coding equipment is thus restored to the normal deenergized condition shown; and a similar operation occurs at each of the signal locations as the trains pass.

Figure 4:
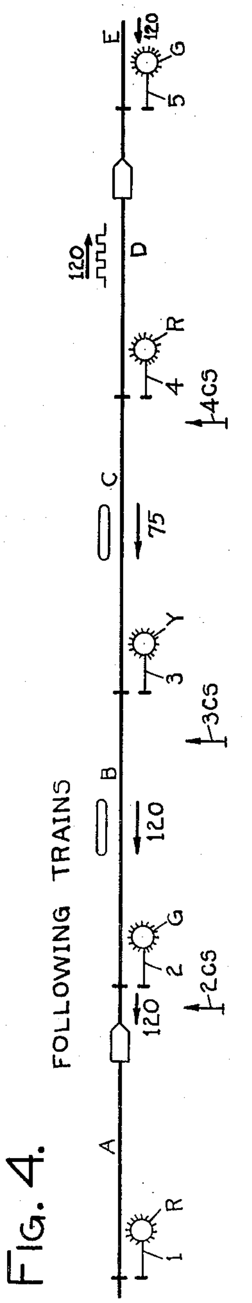
Fig. 4 is an explanatory diagram relating to conditions involved for trains following one another.

*Following trains.*—If, at the time the train has advanced and entered the block D, there should be a following train within the approach starting limits of signal 2, such as indicated in the diagram of Fig. 4 the approach starting control provided by this following train is acting to apply to the entrance end of the block D, occupied by the forward train, a starting driven code. Consequently, when the forward train passes out of the block D, this starting 120 driven code, or any subsequently applied inverse code, energizes the front contact repeater relay 5FP to maintain transmission of a signal clearing control code in block D upon release of the code sending relay 5CS. In other words, the approach starting control exercised by the following train maintains coding in the block D, independently of the release of relay 5CS by the train ahead, so as to provide the appropriate indications for the signals 3 and 4 corresponding to the new relationship of the trains.

If the following train should be near the exit end of the block B at the time the forward train vacates the block D, so that the increase of the code rate from 75 to 120 in the block C does not establish an inverse code in this block to maintain an inverse code in block D, then after release of the relay 4HP, the inverse code in the block D will be cut off, and relay 5FP drops to energize again the code sending relay 5CS, which would be maintained energized by its stick circuit including the front contact $51^5$ of relay 5HP, which has in the meantime been energized by release of relay 5SRP. A similar operation would occur if the following train were in the block C at the time the forward train vacates the block D.

Under exceptional circumstances, such as when a train is broken down or held up, it may be necessary for a following train, after stopping for the permissive stop signal at the entrance to the block occupied by a forward train in accordance with the rules, to enter the same block occupied by the forward train. Under such conditions, when the forward train finally starts up and moves out of the block occupied by the two trains, the presence of the following train will maintain energized the series repeater relay SRP for this occupied block and in turn the associated code sending relay CS, to establish through its front contact, corresponding with the front contact $135^2$ of relay 2CS, a circuit for applying a starting 120 driven code to the block ahead, so that as the trains separate, the approach starting control operates in the regular manner to provide coding in the blocks to govern the signal indications for the following train.

Figures 1C, 5:
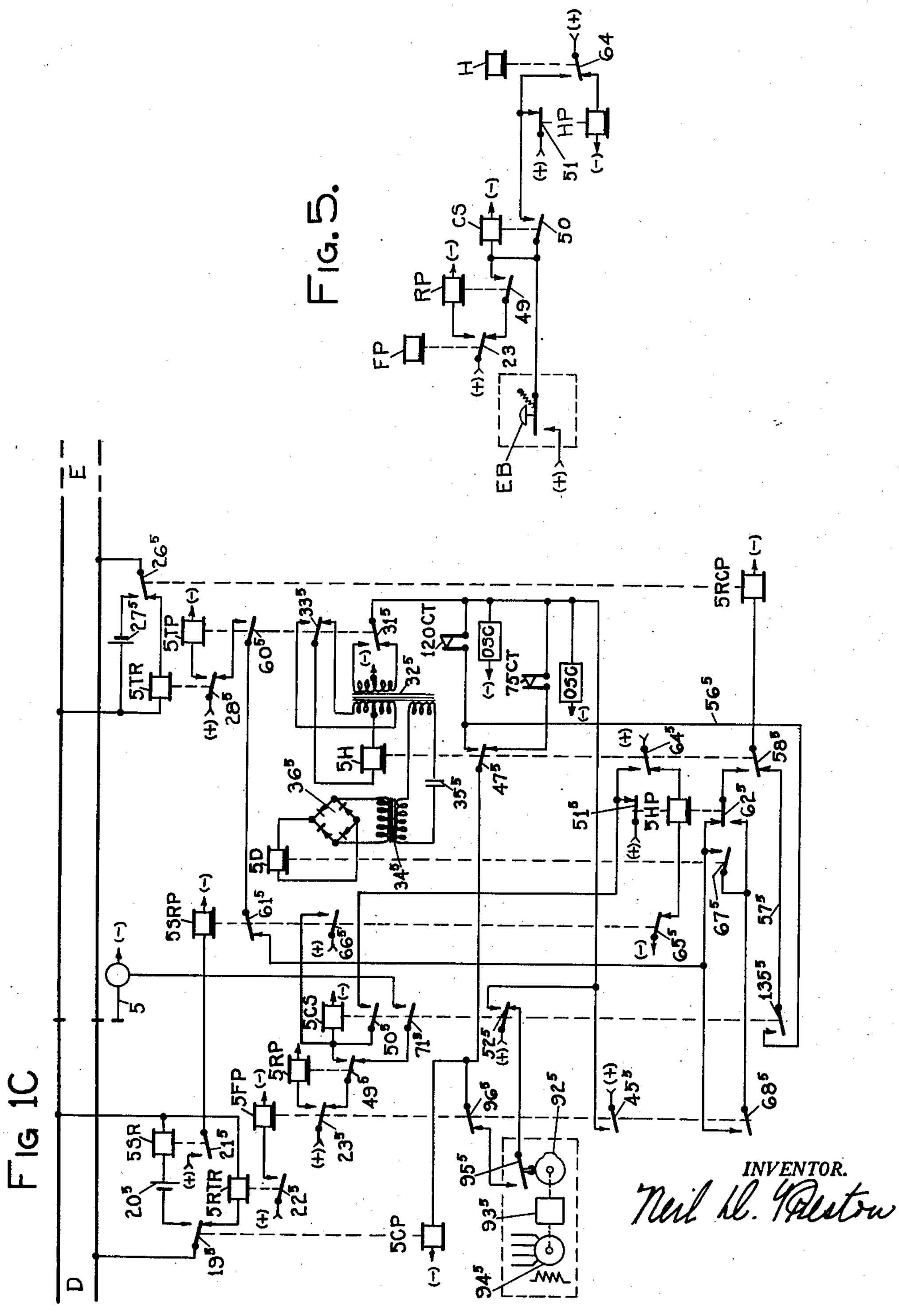
Fig. 5 is a fragmentary circuit diagram illustrating a modified form of control circuits for the code sending stick relay.

If the emergency starting control, later discussed, is relied upon to take care of the situation where two trains enter the same block, then the stick circuit for the code sending relay CS may be simplified as illustrated in Fig. 5, omitting the front and back contacts 65 and 66 of the relay SRP. In this modified arrangement, the CS relay is released as soon as the train enters the next block and drops the associated home relay H, the relay CS releasing its armature to open its front contact 50 during the pick-up time for the relay HP.

Figures 6, 6A:
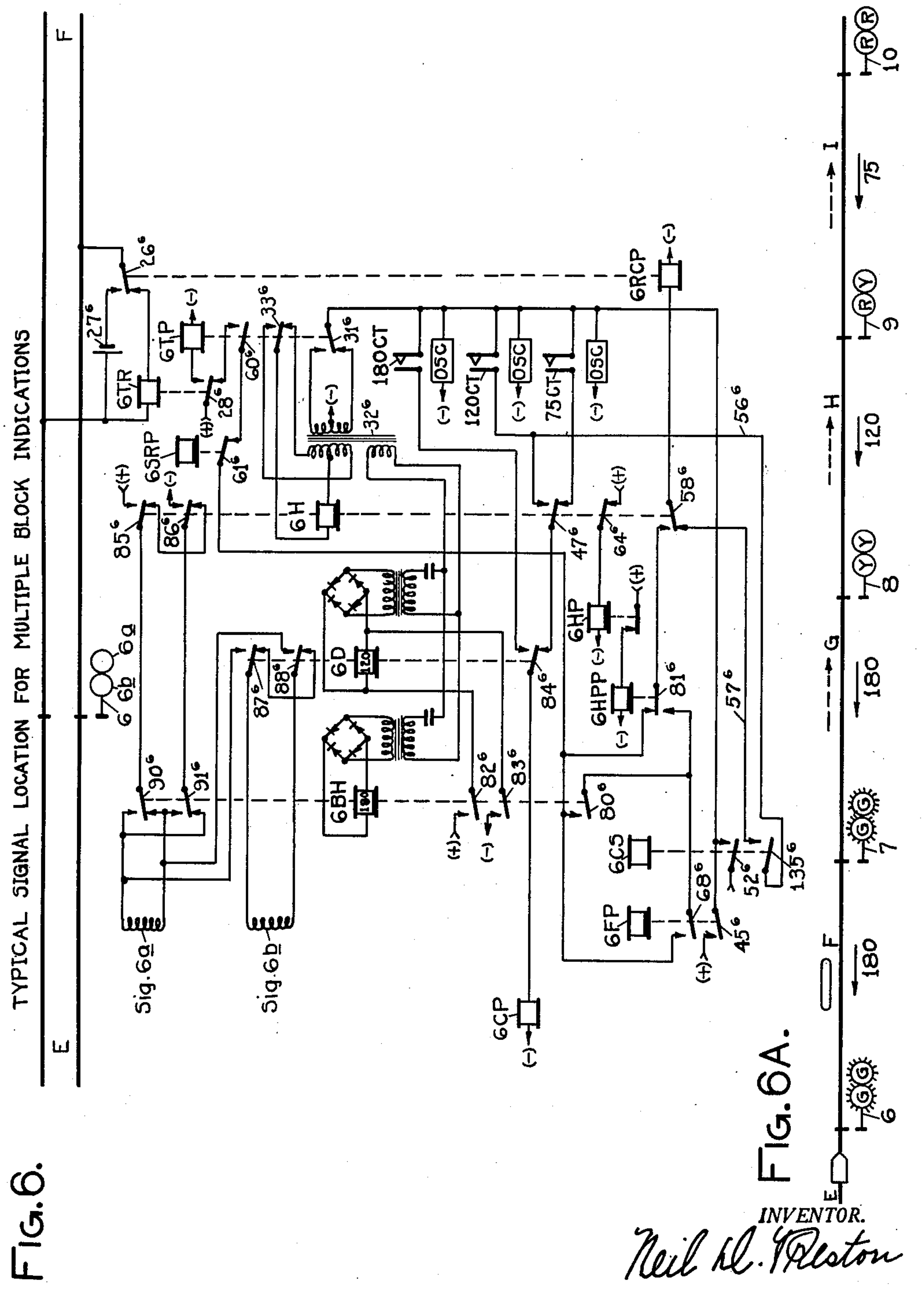
Fig. 6 illustrates an adaptation or modification of the system for multiple block indications.
Fig. 6A is a diagram of the signal indications for this modification.

*Multiple block indications.*—The functions and mode of operation characterizing the system of this invention may be applied to block signalling systems providing more signal indications than the usual stop, caution and clear; and Fig. 6 illustrates how the apparatus shown in Figs. 1A to 3A may be supplemented or modified for a typical signal location to provide a multiple block indication system giving four distinctive indications behind a train, such as indicated in the diagram of Fig. 6A.

This modification, aside from adding another oscillator and decoding means at each signal location for an additional code rate, such as 180 times per minute, merely requires a change in the control circuits for the inverse code transmitter relay 6RCP of each block, so as to provide sufficient time for increasing code rates and establishing inverse coding in two blocks. This may be done in the organization illustrated in Fig. 1A to 3A by increasing the release time of the relay 6HP; or another timing relay such as 6HPP may be combined with it, as shown in Fig. 6. With such increase in the time lapsing from the energization of relay 6H of a block just starting its coding operation, until the maintenance of the inverse code is dependent upon the reception of an inverse code from the rear, sufficient time is provided for increasing the code rate and establishing inverse code in two blocks in the rear; and it can be seen that the system will operate in the same general manner, previously explained in detail and indicated in the sequence diagrams of Figs. 2B and 2E, to provide the appropriate approach starting control for a sufficient number of blocks to provide multiple block signal indications for three different code rates of 75 and 120 and 180, instead of the two code rates of 75 and 120.

In this multiple block indication form of the invention shown in Fig. 6, a front contact $80^6$ of a relay 6BH energized by the highest 180 code rate is used in the inverse control circuit instead of the front contact $67^2$ of relay 2D in Fig. 1A; and a front contact $81^6$ of the slow release relay 6HPP repeating the relay 6HP by an obvious circuit is used to control the inverse code operating circuit in lieu of the front contact $62^2$ of the relay 2HP in Fig. 1A.

In the particular arrangement illustrated, the energization of relay 6BH in response to the reception of the highest 180 code rate, closes front contacts $82^6$ and $83^6$ to energize directly over obvious circuit connections the relay 6D responsive to the 120 code rate, thereby energizing this relay 6D when the 180 code rate is being received. The contacts 180CT of the additional 180 code oscillator are connected to the transmitter relay 6CP through a front contact $84^6$ of the relay 6D; and since this relay 6D is energized when either 120 or 180 code rate is being received, the appropriate highest 180 code rate exists in the rear of each block applied with either 120 or 180 code rate.

In this modification of Fig. 6 for multiple block indications, it is assumed that two signal units *a* and *b* of the searchlight type are used instead of the single signal unit shown in Fig. 1A. The energization of the operating windings of these two signal units *a* and *b* is controlled by the code responsive relays 6H, 6D and 6DH in such a manner as to provide multiple block indications of green over green, yellow over yellow, yellow over red, and red over red, as indicated in the diagram of Fig. 6A. Various circuit arrangements may be employed for this purpose, such as disclosed for example, in the patent to F. X. Rees, No. 2,353,930, July 18, 1944. In the simplified arrangement illustrated, when a block is occupied or its coded track circuit is shut down and deenergized, and the home relay 6H is deenergized, the operating windings of both signal units 6*a* and 6*b* are deenergized, giving an indication of red over red. When a 75 code is received at the signal 6, as in the case of signal 9 in Fig. 6A, the energization of the relay 6H closes its front contacts $85^6$ and $86^6$ to energize the operating winding of the upper signal unit 6*a* over circuit connections readily traced on the drawing with a polarity to move its color screen to the yellow position; and since the relay 6D is not energized by this 75 code, and the operating winding of the other signal unit 6*b* remains deenergized, the resultant signal indication for the 75 code rate is yellow over red. When a 120 code rate is received at the signal 6, as in the case of the signal 8 in Fig. 6A, the energization of the relay 6D closes its front contacts $87^6$ and $88^6$ to supply current of the same polarity applied to the operating winding of the upper signal unit 6*a* to the operating winding of the lower signal unit 6*b*, thereby operating its color screen to the yellow position and giving an indication of yellow over yellow. When the highest 180 code rate is received at the signal 6, the energization of the relay 6BH closes its front contacts $82^6$ and $83^6$ to energize the relay 6D, and also shifts its front contacts $90^6$ and $91^6$ to change the polarity of the energization of the operating windings for both of the signal units 6*a* and 6*b* to give an indication of green over green.

In view of the foregoing discussion, it is believed that the organization and mode of operation of the system for multiple block indications, such as shown in Figs. 6 and 6A, may be readily understood without other diagrams or detail explanation.

*Emergency starting.*—In a system of this type where the coded track circuits are normally deenergized, and coding operation for the appropriate number of blocks ahead of an entrance point or train is accomplished by transmission of driven and inverse codes, failure of the coding equipment for a given track section for some reason may interfere with this approach starting control, with the result that the signal for the exit end of such track section will remain at stop. Under such conditions, a train, after stopping at such signal and then proceeding, will move into deenergized track circuits, where its presence will not be manifested, and no further approach starting control will exist. It can be appreciated that there might be an objectionable delay in traffic over long stretches of equipped territory if such faulty conditions should develop.

One way of meeting this problem is to provide at intervals throughout a long stretch of track equipped in accordance with this invention normally energized or normally coding track sections, which will detect the presence of a train, and which will act to initiate an approach starting control ahead of such track section in the same manner as described for the section in approach to the entrance point shown in Fig. 1A. Such emergency starting track sections would, in the event of an out-of-order condition of some one track circuit, limit the number of stop signals to be passed before reaching the location of the next emergency starting track section.

Another expedient, illustrated in the arrangement shown in Fig. 5, is to provide for each signal location, or for certain selected signal locations, an emergency start button EB, which when actuated manually by a member of the train crew, will energize the associated code sending relay CS directly by an obvious circuit from (+), through the push button EB, winding of relay CS, to (—). It is contemplated that this emergency start push button EB will be located in an appropriate locked cabinet located near the signal and readily accessible to the train crew, and will be of the usual spring-return type. It will be noted that operation of this button EB does not involve in any way control of the signal indications, but merely initiates coding operation, so that faulty or improper operation of this button EB merely starts or maintains a coding operation that may not be necessary.

In the arrangement shown in Figs. 1A to 3A, the emergency starting control is automatic. There is provided at each signal location, or for certain selected signal locations, a constantly operating chopper or coder acting to close a contact for a short time, such as a second, at relatively long intervals, such as two or three minutes. This slow coder or chopper, as shown diagrammatically, is assumed to comprise a cam $92^2$ driven by suitable reduction gearing $93^2$ from a synchronous motor $94^2$, although any other intermittently operating device is suitable for this purpose, since the time intervals involved are not important and an operational failure merely means loss of an emergency starting condition and the possibility of some train delay under exceptional circumstances.

Referring to the emergency starting operation for the signal location 2, as typical of all the other signal locations so equipped, when the slow chopper closes its contact $95^2$, a circuit is established from (+), through back contact $52^2$ of relay 2CS, contact $95^2$ of the chopper, back contact $96^2$ of the relay 2FP, winding of transmitter relay 2CP, to (−). Thus, the slow chopper acts to energize the transmitter relay 2CP and apply energy to the track rails of the associated block A temporarily. This single energization of the track circuit merely energizes the code following track relay 1TR and its repeater 1TP at the other end, without energizing the relay 1H, since this slow-acting relay 1H ordinarily requires two or more code pulses for its energization.

The performing of this test operation without picking up an H relay is particularly desirable at the other signal locations, such as signals 2, 3, 4, etc., because the picking up of an H relay might close the inverse code transmitting circuit and cause the transmission of a pulse to simulate an undesired start condition. Even though the relay 1H should be picked up by a single energization created by the slow chopper, if this energization is prolonged sufficiently, say a second or two, the relay H would assume its normal deenergized position before the associated track relay TR released and would thus keep the inverse code circuit open. Thus, under normal operating conditions, the slow chopper merely energizes the track rails of the associated track section for a short time interval, without causing any actual coding operation.

If, however, this block A should be occupied by a train at a time when the code sending relay 2CS is not energized by approach starting control, as it should be, the energization of the transmitter relay 2CP by the slow chopper permits this train to energize relay 2SR and in turn relay 2SRP to close its front contact $66^2$ and energize the code sending relay 2CS, thereby initiating an automatic start of the approach control for blocks ahead, as well as providing coding in the occupied block ahead of this train for cab signalling purposes if used. The energization of the relay 2CS opens at its back contact $52^2$ the circuit through the contact $95^2$ of the chopper, so that the transmitter relay 2CP may be operated at the appropriate code rate.

The circuit for energizing the transmitter relay 2CP upon closure of the contact $95^2$ of the slow chopper also includes a back contact $96^2$ of the relay 2FP energized by inverse code pulses, so that when this relay 2FP is energized due to an approach starting driven code or an inverse code, as in the case of the remote block of the approach starting zone, i. e. the block C in Fig. 2C, any closure of the contact $95^2$ of the slow chopper that may occur at such time will not interfere with the proper coding operation of the transmitter relay 2CP.

With this automatic starting control just described, the system is in effect one in which the coded track circuits are normally inactive, and also normally deenergized, except when energized temporarily at intervals of several minutes, for the purpose of detecting presence of trains which have failed to set up coding operation by the normal operation of the system, and avoid train delay that might otherwise occur under exceptional circumstances, in the event of a failure of a track circuit or some part of the approach starting apparatus.

From the above description, it will be apparent that the automatic starting control just described involves means for momentarily energizing the associated track circuit at spaced intervals together with means for detecting the presence or absence of a train in such track circuit during such intervals. The train detecting means is shown as taking the form of a series relay SR, which series relay acts directly to pick up the code sending relay CS to initiate coding in advance of the train. However, it should be understood that other forms of train detecting means may be employed in place of the series relay. For example, a shunt type relay such as disclosed in the prior application of J. Y. Howard, Ser. No. 599,827, filed June 16, 1945, now Patent Number 2,588,005, dated March 4, 1952, may be employed in place of the series relay.

On the other hand, as previously mentioned, the emergency starting of the coding operation may take the form shown in Fig. 5 where the slow coder organization of Figs. 1A, 1B and 1C is replaced by a simple manually operable self-restoring push button EB. In this modified form of Fig. 5, it is apparent that the code sending relay CS is directly picked up, so that the train detection means of Figs. 1A, 1B and 1C is not required for such purpose. Thus, the front contact 66 of the series repeater relay SRP is omitted which also permits the omission of the contact 65 included in the pick-up circuit of relay HP. However, it should be understood that even though the system of Figs. 1A, 1B and 1C is modified as indicated in Fig. 5, the train detection means shown as taking the form of a series relay SR, may still be used to effect the remaining function of the series relay which by back contact 61 causes the advance of the approach starting control while a train is approaching a clear signal as above described. This explanation is given to more clearly point out the fact that the series relay SR of Figs. 1A, 1B and 1C has two distinct functions one of which is associated with the automatic start control, and the other of which is in connection with the governing of the inverse code in the track section in advance for causing the initiation of the coding to reach ahead as the train approaches a signal. When the system is organized in accordance with Fig. 5, there may be some cases where the latter named feature of the series relay will not be desired, in which cases the series relay can be omitted entirely without affecting the remaining features of approach starting control contemplated by the present invention.

Figure 7:
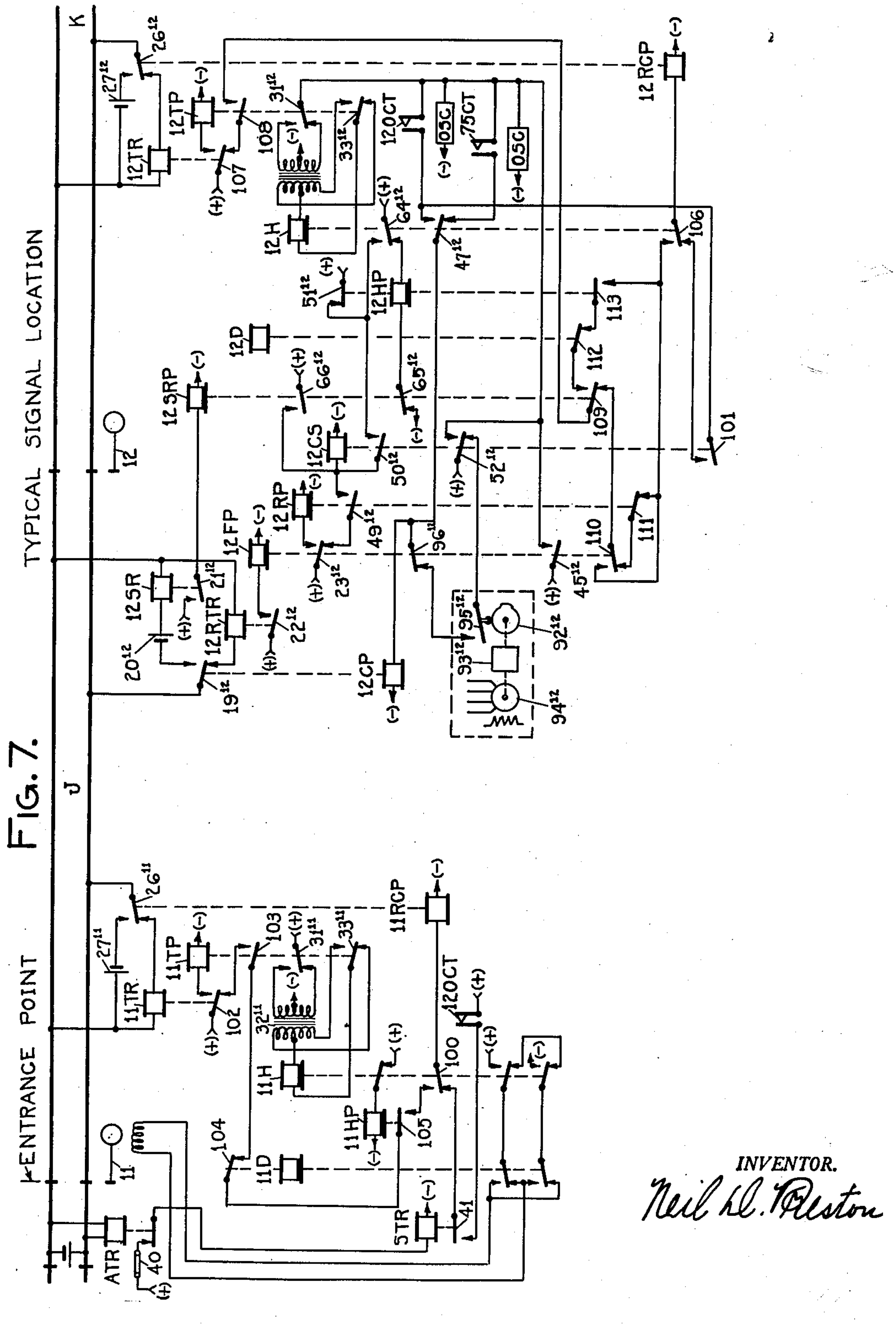
Fig. 7 shows a modified circuit organization for one typical signal location.

*Modification of Fig. 7.*—The same general plan of operation characteristic of this invention, and involving transmission of an approach starting code in successive blocks by a tumble-down control of inverse code until the highest code rate is received, may be carried out in different ways; and Fig. 7 illustrates a modified circuit organization for performing these functions. This modified arrangement differs from that shown in Figs. 1A to 1C primarily in the control of the inverse code, which in general is temporarily cut off for the tumble-down control and energization of a code sending relay. This modification involves the same control circuits for the code sending relays, such as the relay 12CS in Fig. 7, and emergency start by a slow chopper; and except for the control of the inverse code and the operating sequence, is so much like the form of the invention disclosed in Figs. 1A to 1C that a brief explanation of the operating sequence in connection with the diagrams of Figs. 8A to 8E will make clear the characteristic features and mode of operation of this modified circuit organization. Also, although the relays and circuits are illustrated in Fig. 7 for only one typical signal location 12, in addition to those for a signal location 11 at an entrance point to the equipped territory, the operation may be readily explained and understood for a series of blocks by bearing in mind that the circuits for the other signal locations are the same as those shown for the typical signal location 12.

Considering first the operation when coding is to be established for the appropriate number of blocks ahead of an entrance point to the equipped stretch, when the start relay STR is deenergized for the purpose and in the manner previously discussed, a starting 120 code is transmitted from the entrance end to the exit end of the first block J, corresponding with block A in Fig. 1A. This energizes the track relay 12RTR at the exit end of the block J, and in turn its repeater relay 12FP, which starts the code oscillators OSC and causes transmission of a 75 signal control driven code to the entrance end of the block J to energize a home relay 11H. The energization of the home relay 11H opens its back contact 100 to cut off the starting driven code, which causes release of the relay 12FP and energization of the code sending relay 12CS in the same manner as previously described. The energization of the code sending relay 12CS and closure of its front contact 101 applies a starting code to the next block K, which energizes the relay 13FP at the exit end of this block, starts the code oscillators, and causes transmission of a 75 signal control code in this block K.

In this modification of Fig. 7, when the relay 11HP at the signal 11 releases, an operating circuit for the transmitter relay 11RCP to provide inverse code pulses is established from (+), through back contact 102 of track relay 11TR, front contact 103 of its repeater relay 11TP, back contact 104 of a distant relay 11D, back contact 105 of relay 11HP, front contact 100 of relay 11H, and transmitter relay 11RCP, to (−).

Figures 8A, 8B, 8C:
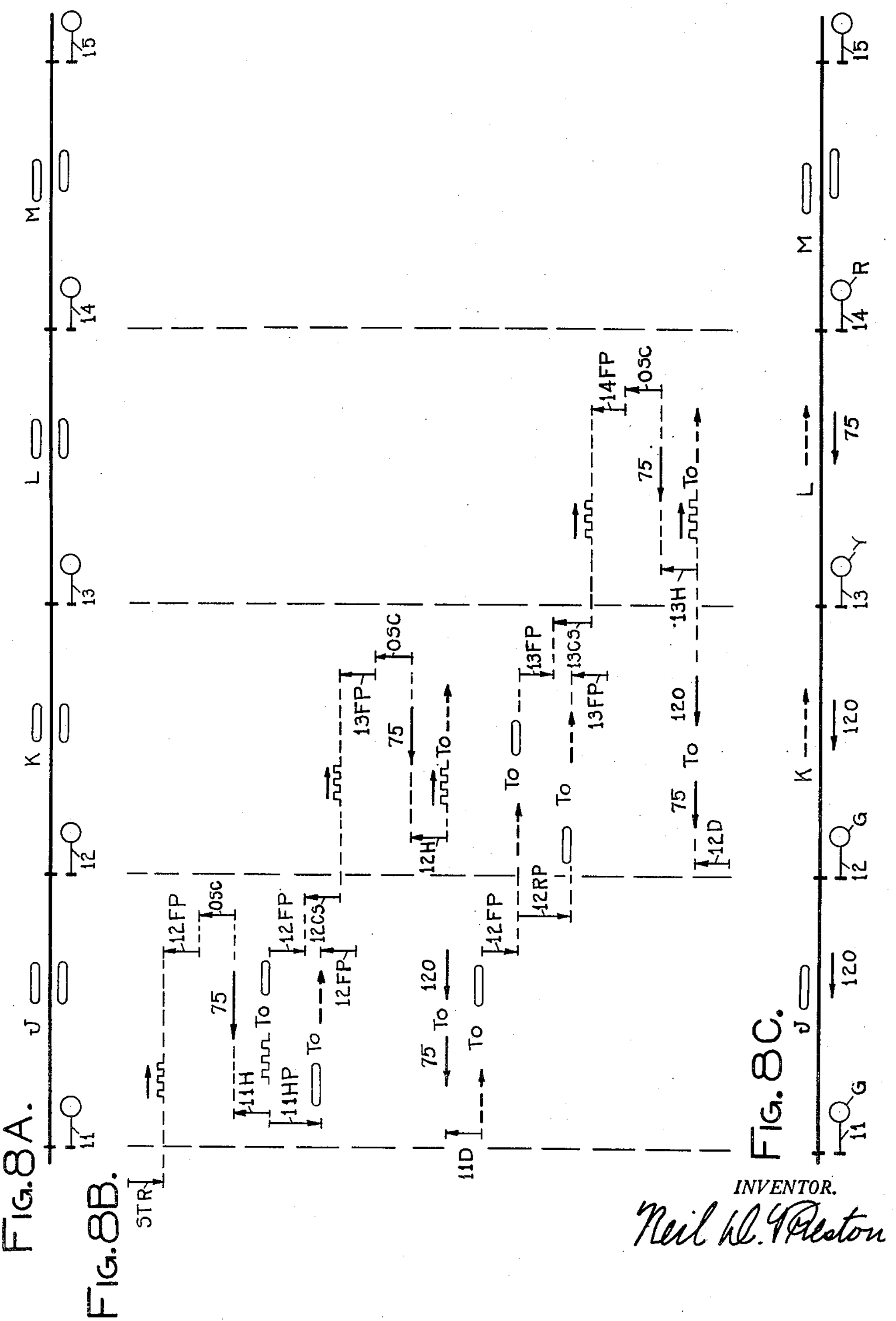
Figs. 8A to 8F are explanatory charts or diagrams, similar to those of Figs. 2A to 2F, illustrating the conditions and sequence of relay actuation for the modified circuit organization of Fig. 7.

Thus, in this modified arrangement, after the starting code in block J has been cut off long enough to cause energization of the code sending relay 12CS for the exit end of this block, an inverse code is applied, as indicated in the sequence diagram of Fig. 8B, which restores the inverse code responsive relay 12FP. Consequently, when the signal control driven code is established in block K, and the home relay 12H for signal 12 is energized to cut off at its back contact 106 the approach starting code, the inverse code responsive relay 12FP has been energized, and the starting code is changed to an inverse code. The inverse code operating circuit for the transmitter relay 12RCP under these conditions may be traced from (+), through back contact 107 of track relay 12TR, front contact 108 of its repeater relay 12TP, back contact 109 of the series repeater relay SRP, front contact 110 of relay 12FP, front contact 106 of home relay 12H, and transmitter relay 12RCP, to (−).

In this modification, the purpose of the relay 11HP, and similar relays for the other signal locations, is to delay the application of an inverse code after removal of the starting driven code long enough for the relay 12FP at the other end of the block to release and to cause energization of the code sending relay 12CS; and hence the release time of this relay 11HP is made somewhat longer than the time required for the release of relay 12FP and energization of the code sending relay 12CS.

Resuming consideration of the sequence of operation for this modification of Fig. 7, as indicated in the diagram of Fig. 8B, the energization of the home relay 12H at signal 12 changes the code rate for the block J from 75 to 120, which energizes the relay 11D and opens its back contact 104 to stop transmission of the inverse code of block J. This causes the release of the relay 12FP, which opens at its front contact 110 the circuit previously mentioned for operating the transmitter relay 12RCP to provide inverse code pulses. This change from inverse code to nothing in the block K releases the relay 13FP at the exit end of this block to energize the associated code sending relay 13CS. While this is occurring, the repeater relay 12RP is timing; and after an interval long enough to assure energization of the code sending relay 13CS, this repeater relay 12RP closes its back contact 111 to establish an inverse code operating circuit for the transmitter relay 12RCP, similar to the one previously traced, but now including in series the back contacts 110 and 111 of relays 12FP and 12RP.

The energization of the code sending relay 13CS at the exit end of the block K starts coding operation for the next block L in the same manner described for block K, and changes the starting code to an inverse code. Also, the code rate in the block K is changed from 75 to 120 to energize the distant relay 12D; but this does not disturb the transmission of inverse code in block K, as it did in the case of the entrance signal 11, since the inverse code operating circuit is made up through the two back contacts of the relays 12FP and 12RP.

Thus, as the result of this sequence of relay operation just described, and indicated in the diagram of Fig. 8B, coding is established in the three blocks J, K and L ahead of the entrance point as shown in the diagram of Fig. 8C.

Figure 8D:
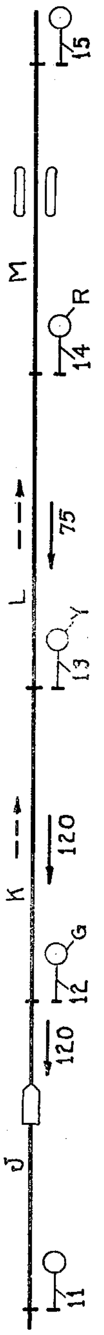
Figure 8E:
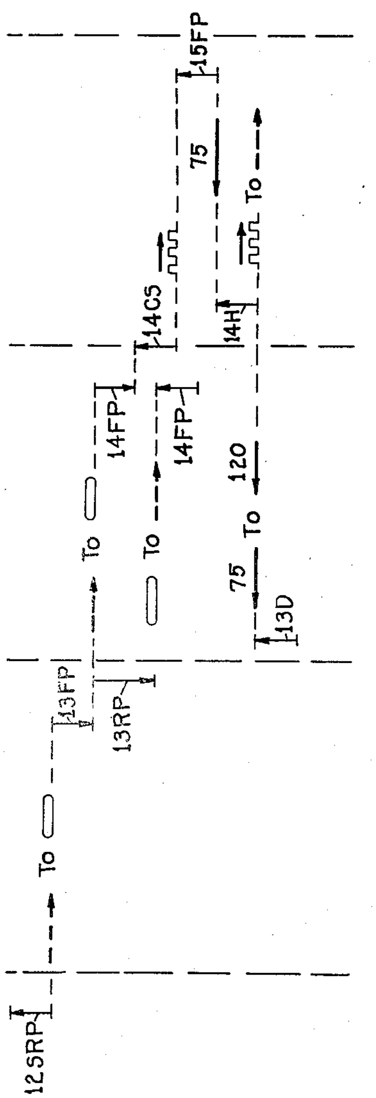

Considering now the way in which the approach starting control is extended as a train travels through the equipped stretch, assume as a typical example of this operation, that a train in block J advances to the point indicated in the diagram of Fig. 8D, where the series repeater relay 12SRP at the exit end of this block is energized. Referring to Fig. 7, it can be seen that the energization of the relay 12SRP opens at its back contact 109 the then existing inverse code operating circuit previously described, and establishes a circuit connection for inverse code operation, which includes in series a back contact 112 of the distant relay 12D and a back contact 113 of the slow release relay 12HP. At this time, although the relay 12HP is released to close its back contact 113, the relay 12D is energized to open its back contact 112, so that the inverse code in block K is changed to nothing. This releases the inverse code responsive relay 13FP at the exit end of block B, and also in time its repeater relay 13RP. Referring to Fig. 7, it can be seen that the inverse code operating circuit is opened when the relay 12FP opens its front contact 110, and is again closed when its repeater relay 12RP closes its back contact 111. In other words, a cessation of inverse code cuts off temporarily the inverse code in the next block in advance; and this operation occurring in connection with block L causes energization of the code sending relay 14CS at the end of this block to initiate coding operation in the next block M in advance. At the time the signal control driven code in this remote block M is received and energizes the home relay 14H, the associated inverse code responsive relay 14FP has been reenergized, so that the energization of the home relay 14H changes the starting driven code to an inverse code, thereby maintaining energized the relay 15FP at the exit end of this block M, and avoiding any further extension of the approach starting control.

Figure 8F:
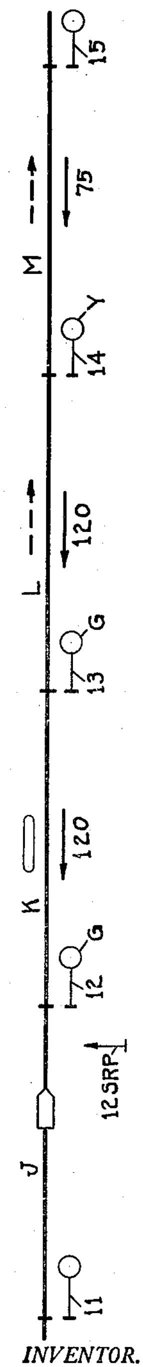

When coding has been established in one additional block M in this manner, the code rate in block L is changed from 75 to 120; and then the coding conditions and the signal indications are those shown in the diagram of Fig. 8F. The same operation is repeated as the train reaches the end of the block K, and for successive blocks as the train moves through the stretch of track.

The modified arrangement of Fig. 7 incorporates the same expedient of a slow chopper or coder shown in Figs. 1A to 1C for an automatic emergency starting control, which acts in the same manner as previously described, if a train is present, to cause artificial energization of the associated code sending relay, such as 12CS in Fig. 7, thereby closing its front contact 101 to provide a starting driven code for the next block in advance. In the case of such an emergency start, the back contact 113 of the relay 12HP and the back contact 112 of the distant relay 12D, with the relay SRP energized by the presence of the train to close its front contact 109, cooperate in the same manner as described for the signal location 11 at an entrance point to cause the approach starting control to be extended for the appropriate number of blocks ahead of the train causing such emergency starting operation. It is believed that the operation in this respect can be readily understood from the sequence diagram of Fig. 8B and the foregoing explanation in connection with starting at an entrance point, without other diagrams or description for the emergency starting condition.

The operation of the modification of Fig. 7 with respect to approach lighting, restoration of the code sending relays, and relative movement of following trains, is in effect the same as previously described for the embodiment of the invention shown in Figs. 1A to 1C, so that further discussion is unnecessary.

Various other adaptations, modifications, and additions may be made with respect to the specific embodiments of the invention shown and described; and I desire to have it understood that the specific organizations of relays and circuits herein disclosed are merely typical or representative of the functions, operating characteristics and nature of the invention.

What I claim is:

1. A coded track circuit automatic block signal system for a series of consecutive blocks signalled for train movement in one direction only comprising, a coded track circuit for each block including code transmitting means at each end normally at rest to leave the track rails deenergized if no train is approaching within a limited distance, code sending means at the exit end of each block rendered effective by current pulses of fixed polarity transmitted at intervals over the track rails from the entrance end of that block for rendering the associated code transmitting means effective to transmit a signal control driven code at a code rate dependent upon the coding operation of a track circuit of a block ahead, code responsive means for each block energized only in response to the reception of a signal control driven code at the highest code rate, and means for said blocks including said code responsive means and controlled by the presence of a train for governing transmission of said current pulses from the entrance ends of blocks to initiate coding operation of track circuits for blocks ahead of a train until the highest code rate exists in a block ahead of such train unless traffic conditions otherwise prevent.

2. In a coded track circuit automatic block signalling system for a stretch of railway track signalled for one direction of train movement only, a series of consecutive blocks each having a signal at the entrance end governing train movement in the same direction, coding equipment including code transmitting means and code receiving means associated with each end of each block, said coding equipment being normally at rest and leaving the track rails deenergized with no trains present within a limited distance, said coding equipment for each block when set into operation being operable to transmit signal control driven code pulses of a code rate selected in accordance with traffic conditions toward the entrance end of the block and at times inverse code pulses toward the exit end of the block, code initiating means for the exit end of each block controlled by code pulses of a fixed polarity received by said receiving means from the entrance end of that block to render the associated code transmitting means active to transmit signal control driven code pulses toward the entrance end of that block, means responsive to the presence of a train for operating said code initiating means at the exit end of a predetermined number of blocks ahead of said train to provide signal control driven codes for governing the signals ahead of such train, and means for automatically restoring said code initiating means to normal in the successive blocks behind such train as it travels through the stretch.

3. An automatic block signalling system for multiple track railroads comprising, a stretch of track divided into a series of consecutive blocks and provided with signals at the entrance ends of said blocks for governing train movement in one direction only, a coded track circuit for each block having an inverse code transmitter at the entrance end and a driven code transmitter at the exit end normally inactive and leaving the track rails deenergized until its coding operation is automatically started, means associated with said blocks and cooperating to automatically initiate coding operation of the driven code transmitters at the exit ends of a predetermined limited number of blocks ahead of a train moving through the stretch, said means acting in response to the application and removal of starting code pulses to the deenergized track rails at the entrance end of said blocks, said means including apparatus for applying starting code pulses of a fixed polarity to the entrance end of a block at a time when its track rails are not energized at the exit end and for subsequently rendering said inverse code transmitting means active to limit the number of blocks through which coding is initiated, and means governed by the passage of a train for automatically restoring each coded track circuit to its normal inactive condition behind said train as it moves through the stretch.

4. An automatic block signal system of the character described for multiple track railroads comprising, a coded track circuit for each of a series of consecutive blocks of a stretch of track, said coded track circuits being normally inactive and leaving the track rails deenergized, means associated with said blocks and cooperating to automatically initiate the coding operation in each of a plurality of blocks in turn ahead of a train as it moves through the stretch, said starting means including apparatus for initiating coding operation of an inactive track circuit by transmitting driven code pulses at a predetermined rate from the entrance end to the exit end of such track circuit, said starting means transmitting said driven code pulses until driven code pulses are received at the entrance end of such track circuit by its coding operation, and means for automatically restoring said coded track circuits to their normal inactive condition one at a time behind a train moving through the stretch.

5. In a coded track circuit system of the character described for a stretch of track divided into blocks and signalled for train movement in one direction only, a coded track circuit for each block normally inactive and leaving the track rails deenergized, said track circuits when set into operation acting to transmit a signal control driven code toward their entrance ends at a code rate dependent upon the coding operation of a track circuit ahead and at times inverse code pulses in the opposite direction, a code transmitter relay for the entrance end of each block, coding contacts intermittently operated at a predetermined code rate and located adjacent the adjoining ends of said blocks, and means associated with the several blocks and cooperating to automatically initiate coding operation of the track circuits for a limited number of blocks ahead of a train moving through the stretch, said means including means responsive to a control transmitted over the track rails of a block from its entrance end by the application and removal of code pulses for operating the transmitter relay for the next block in advance from its associated coding contacts when the coded track circuit for that block in advance is inactive and until driven code pulses are received at the entrance end of that block.

6. In a coded track circuit automatic block signal system of the type described, a series of consecutive blocks each having code transmitting and code receiving means at each end, said track circuits being normally inactive to leave the track rails deenergized, said track circuits when set into operation acting to transmit a signal control driven code toward their entrance ends at a code rate dependent upon the coding operation of a track circuit ahead and at times inverse code pulses in the opposite direction, starting means associated with the several blocks and cooperating by tumble-down control of the inverse code pulses in successive blocks to cause operation of the code transmitting means of the next normally inactive track circuit ahead by application of starting code pulses, and means for each block energized only in response to the reception of a signal control driven code of the highest code rate for arresting such tumble-down control of inverse code and maintaining existing coding conditions in the blocks ahead until a train advances to within a predetermined distance from the entrance end of said block receiving the highest code rate.

7. An automatic block signalling system for a stretch of track divided into a series of consecutive blocks and signalled for train movement in one direction only, a coded track circuit for each block normally inactive to leave the track rails deenergized, each of said coded track circuits including code transmitting and code receiving means at each end and operable when set into coding operation to provide signal control driven codes of a selected code rate toward the entrance end of the associated block and at times inverse code pulses in the opposite direction, starting means associated with the several blocks and cooperating to apply a starting driven code of a predetermined rate to the entrance end of the normally inactive track circuits of successive blocks one at a time in turn ahead of a train in said stretch, means for each block governed by said starting driven code for causing coding operation of the associated track circuit to provide a signal control driven code at a code rate dependent upon the coding operation of the track circuit of a block ahead, means responsive only to the reception of a signal control code of the highest code rate in a given block for governing said starting means for blocks ahead to arrest the application of a starting driven code to other additional blocks, and means responsive to the passage of a train for automatically restoring the coded track circuit of each block to its normal inactive condition behind such train, whereby coding operation is automatically initiated for a limited number of blocks ahead of a train as it moves through the stretch and is automatically discontinued behind such train.

8. A coded track circuit automatic block signal system for a series of blocks signalled for train movement in one direction only comprising, coded track circuit apparatus for each block normally deenergized while no train is approaching within a limited distance and leaving the track rails deenergized, said apparatus being operable at times to provide signal controlling driven code pulses of a selected code rate dependent upon the coding operation of a track circuit ahead, said apparatus being also operable at times to provide an inverse code during the off intervals of the driven code being received, means responsive to the presence of a train in a given block for creating a starting energization of the track rails of the next block ahead to initiate coding operation of its track circuit, inverse code control means for governing the transmission of inverse code in a given block dependent upon the rate of the driven code being received and the existence of an inverse code in the next block in the rear, said starting means and said inverse code control means for said blocks cooperating to initiate automatically coding operation of the track circuits of a plurality of blocks ahead of a train as required to provide the highest code rate in the block ahead of such train if traffic conditions otherwise permit.

9. An automatic block signal system for a series of consecutive blocks signalled for train movement in one direction only and comprising, a normally deenergized coded track circuit for each block operable to transmit driven and inverse code pulses at times in both directions, code sending means for the exit end of each block for causing transmission of a signal control driven code of a selected code rate, control means for the entrance end of each block for controlling the transmission of inverse code pulses toward the exit end of that block to govern operation of the associated code sending means, said control means being operable by a signal control driven code of the highest code rate and also by the reception of inverse code pulses at the exit end of the next block in the rear, said code sending means including a relay maintained in its actuated condition until automatically restored by the passage of a train, said code sending means and said control means for the several blocks cooperating to initiate coding operation for a plurality of blocks ahead of a train until a signal control driven code of the highest code rate is transmitted in a block ahead of such train.

10. In a coded track circuit automatic block signal system for multiple track railroads, a stretch of track divided into a series of consecutive blocks each having a signal at the entrance end governing train movement in the same direction, a coded track circuit for each block normally at rest and also deenergized, said coded track circuit including code transmitting means and track relays at each end and acting when set into operation to provide driven code pulses toward the entrance end of the associated block for governing the indications of its signal, said code transmitting means for the entrance end of said coded track circuit acting in response to the reception of signal control code pulses to transmit inverse code pulses toward the exit end of the block during the off intervals between the driven code pulses being received, means responsive to train presence for causing operation of the code transmitting means for the entrance end of a block to provide a starting control energization of the track rails of that block, means at the exit end of each block responsive to the reception of said starting control energization for operating the associated code transmitting means to transmit a signal control driven code toward the entrance end of that block, and inverse code control means for each block governed in accordance with the rate of the driven code being received and also by the transmission of an inverse code in the next block in the rear for controlling the transmission of inverse code in each block, said inverse code control means for the several blocks cooperating to automatically extend said starting control energization for an appropriate number of blocks to provide the highest code rate in the block ahead of the train.

11. An automatic block signalling system for multiple track railroads comprising, a series of consecutive blocks signalled for train movement in one direction only and each having a normally deenergized coded track circuit, each of said track circuits including code transmitting means and a track relay for each end of the block, means responsive to the intermittent operation of the track relay at the exit end of a block for causing operation of the associated code transmitting means at a code rate determined by the condition of the track circuit of a block ahead, approach starting means for the exit end of each block rendered effective by the cessation of an existing intermittent operation of the associated track relay for maintaining operation of the associated code transmitting means and for also controlling the code transmitting means for the entrance end of the next block ahead to provide approach starting control for that next block ahead, means responsive to the reception of a driven code at the entrance end of each block for transmitting at times inverse code pulses during the off intervals of the driven code being received, and means dependent upon the code rate of the driven code being received in a given block and also the existence of an inverse code in the next block in the rear for controlling the transmission of inverse code in said given block.

12. An automatic block signal system for multiple track railroads comprising, a stretch of track divided into blocks and having signals at their entrance ends governing train movement in one direction only, a normally inactive and deenergized coded track circuit for each block including code transmitting means operable to transmit signal control driven codes of any one of three different code rates, said coded track circuit of each block being also operable at times to transmit an inverse code only if the signal control driven code being received is of the highest code rate or an inverse code exists in the next block in the rear, and automatic approach starting means for the several blocks governed by tumble-down control of the inverse code in a number of successive blocks and cooperating to initiate automatically coding operation in a number of blocks ahead of a train sufficient to provide signal indications for all three code rates if traffic conditions otherwise permit.

13. In an automatic block signalling system for stretches of railway track having normally deenergized coded track circuits and comprising, in combination with a series of consecutive blocks each having a signal at the entrance end governing train movement in the same direction, coded track circuit equipment for each block normally at rest and leaving the track rails deenergized when no train is approaching within a limited distance, said coding equipment including a transmitter relay at the entrance end of each block, means responsive to train presence for operating said transmitter relay at times to transmit code pulses toward the exit end of that block, code sending means for the exit end of each block rendered effective by the application and removal of code pulses transmitted from the entrance end of that block for conditioning the associated coding equipment to provide signal control driven code pulses of a rate selected in accordance with traffic conditions, and means responsive to the passage of a train for automatically restoring said code sending means to its normal inactive condition.

14. A coded track circuit system for governing the indications of signals at the entrance ends of blocks of a stretch of track signalled for train movement in one direction only comprising, a coded track circuit for each block including code transmitting means and code receiving means at each end, said coded track circuits being normally deenergized when a train is approaching within a limited distance, means including the code receiving means at the exit end of each block and responsive to the continued reception of spaced current pulses from the entrance end of that block for rendering the associated code transmitting means effective to transmit signal control driven code pulses at a code rate depending upon the coding operation of a track circuit ahead, code sending means for the exit end of each block initially operated by the cessation of current pulses from the entrance end of that block and maintained in operation until restored for also rendering the associated coded transmitting means effective to transmit signal control driven code pulses of a selected code rate, and means operated by the passage of a train for automatically restoring said code sending means to its normal condition and thereby stop coding operation of the track circuits behind a train.

15. In an automatic block signalling system for stretches of track signalled for train movement in one direction only and comprising, coding equipment for each block of a series of consecutive blocks including a code transmitter relay and a track relay at each end of the block, said coding equipment being normally at rest and leaving the track rails deenergized when no train is present within a limited distance, code sending means for the exit end of each block operated by the application and removal of current pulses received over the track rails of that block from the entrance end for rendering effective the associated code transmitter relay to provide signal control driven code pulses of a rate determined by traffic conditions ahead, means for maintaining each code sending means in its operated condition until automatically restored by passage of a train, and means governed by train movement through said blocks for controlling the transmission of current pulses to the exit ends of the predetermined number of blocks ahead of a train and thereby causing operation of said code sending means for such blocks, whereby coding operation is automatically initiated for a predetermined number of blocks ahead of a train and the coding equipment for each block is automatically restored to its normal deenergized condition by the passage of such train.

16. In a coded track circuit automatic block signal system for a stretch of track divided into a series of consecutive blocks and signalled for train movement in one direction only comprising, a coded track circuit for each block normally at rest and leaving the track rails deenergized when no train is present within the determined limits, said coded track circuit including a code transmitter relay and a track relay at each end, code starting means at the exit end of each block operated by the application and removal of current pulses received over the track rails of that block from the entrance end for rendering the associated transmitter relay effective to transmit signal control driven code pulses of a rate selected in accordance with traffic conditions ahead, said code starting means also acting to provide starting control pulses for the next block in advance, means associated with said blocks and governed in accordance with the rate of driven code being received for cooperating to automatically extend said starting control pulses from block to block ahead of the train for a predetermined limited number of blocks, and means actuated by train movement for restoring the code starting means of each block to its normal inactive condition as a train passes.

17. An automatic block signal system for multiple track railroads signalled for train movement in one direction only comprising, a series of consecutive blocks each having a normally deenergized coded track circuit, said coded track circuit including code transmitting means at the exit end of the block normally at rest and operable to transmit driven code pulses at a rate dependent upon coding operation of the track circuit of a block ahead, code sending means for the exit end of each block rendered effective by the reception and discontinuance of current pulses over the track rails from its entrance end, means for maintaining said code sending means effective independently of such current pulses until automatically restored by the passage of a train, means for the exit end of each block actuated only in response to the presence of a train in that block for governing the transmission of the current pulses actuating said code sending means for a predetermined number of blocks ahead, whereby coding operation is automatically initiated for a limited number of blocks ahead of a train and is automatically discontinued by the passage of a train to restore the coded track circuits behind a train to their normal deenergized condition.

18. A coded track circuit automatic block system for railroads comprising, a normally inactive and deenergized coded track circuit for each block including code transmitting means and code receiving means at each end of the block, said coded track circuits being operable to transmit signal control driven code pulses in one direction and at times approach starting driven code or inverse code pulses in the opposite direction, code sending means for the exit end of each block initially actuated by the cessation of an existing inverse code and maintained in its actuated condition until automatically restored by train movement, said code sending means when actuated maintaining the associated code transmitting means effective to provide signal control driven code of a selected code rate and also acting initially to provide a starting driven code in the next block ahead, and means responsive to the presence of a train in a given block for causing cessation of the inverse code in a remote block ahead to actuate the code sending means of that block.

19. In an automatic block signalling system for railroads, a stretch of track divided into blocks and provided with signals for governing train movement in one direction only, a coded track circuit for each block including a code transmitter relay and a code following track relay for each end of the block, said transmitter relays being normally inactive and leaving the track rails of the blocks deenergized when no train is approaching within a limited distance, means for at times operating the transmitter relay at the entrance end of a block at a predetermined code rate to transmit an approach starting driven code toward the exit end of that block, means at the exit end of each block responsive to the reception of such starting driven code for rendering the associated code transmitter relay effective to transmit signal control driven code pulses toward the entrance end of that block, and means for the entrance end of each block responsive to the reception of signal control driven code pulses for discontinuing the transmission of the starting control driven code and operating the associated code transmitter relay to provide inverse code pulses.

20. An automatic block signal system for a series of consecutive blocks signalled for train movement in one direction only comprising, a normally deenergized coded track circuit for each block operable when set into operation to transmit signal control driven code pulses of a selected code rate toward the entrance end of the block and inverse code pulses at times in the opposite direction during the off intervals of the driven code being received, inverse code control means associated with the entrance end of each block for governing the transmission of inverse code pulses in that block, said means being dependent upon the rate of driven code being received in that block and the existence of an inverse code in the next block in the rear, means responsive to train presence for providing a starting energization of the track rails at the entrance end of each block to initiate coding operation of the track circuit of that block, said inverse code control means and said starting means for the several blocks cooperating to initiate automatically coding operation of the coded track circuits for a predetermined limited number of blocks ahead of a train, and means responsive to the passage of a train for restoring each coded track circuit to its normally deenergized condition behind such train.

21. In an automatic block signalling system for multiple track railroads having normally deenergized coded track circuits automatically initiated and restored to normal by train movement, a series of consecutive blocks each equipped with coded track circuit apparatus at each end normally at rest and leaving the track rails deenergized, approach starting means associated with said blocks and responsive to train presence for cooperating to automatically initiate coding operation of a predetermined number of coded track circuits ahead of such train, said approach starting means including apparatus associated with the entrance end of each block for transmitting driven code pulses toward the exit end to initiate the transmission of signal control driven code pulses in the opposite direction toward the entrance end, inverse coding apparatus associated with the entrance end of each block and operable to transmit inverse code pulses during the off intervals of the driven code being received, and means responsive to the reception of signal control driven code pulses at the entrance end of each block to discontinue transmission of the approach starting driven code in that block and render said inverse coding apparatus effective.

22. A coded track circuit system of the normally deenergized and inactive type for automatic block signal systems on multiple track railroads comprising, a stretch of track divided into successive blocks with signals at the entrance ends of said blocks for governing train movement in one direction only, a normally deenergized coded track circuit for each block including a code transmitter relay at the entrance end operable to transmit driven or inverse code pulses toward the exit end of that block, starting means responsive to the cessation of an existing inverse code at the exit end of a block for operating the transmitter relay for the next block ahead to transmit starting driven code pulses at a predetermined rate, means for the entrance end of each block responsive to the reception of driven code pulses at that end for changing the starting driven code in that block to an inverse code, and means responsive to the presence of a train in each block in turn as a train moves through the stretch for governing the transmission of inverse code in a plurality of blocks ahead of such train and thereby cause operation of the starting means for a remote block, whereby approach starting control by driven code pulses is automatically initiated for a predetermined number of blocks ahead of a train as it passes through the stretch by a tumble-down control of the inverse code ahead of such train.

23. In a normally inactive coded track circuit for an automatic block signal system, a code transmitter relay and a track relay for the entrance end of each of a series of consecutive blocks, a starting circuit for operating said transmitter relay of a block from coding contacts to provide an approach starting control for that block, an inverse code circuit for operating said transmitter relay of a block to provide inverse code pulses during the off intervals of a driven code being received, and a code responsive relay for the entrance end of each block energized by the intermittent operation of the associated track relay at any code rate, said code responsive relay acting when energized to shift the control of the associated transmitter relay from said starting circuit to said inverse code circuit.

24. A coded track circuit system for a series of consecutive blocks having normally deenergized coded track circuits automatically set into operation and restored by train movement and comprising, a normally deenergized track relay at the exit end of each block, means for at times transmitting spaced current pulses over the track rails of each block from the entrance end thereof to intermittently operate the associated track relay, a repeater relay for each track relay maintained energized by the intermittent operation thereof, a code sending stick relay for the exit end of each block initially energized momentarily by the release of said repeater relay, stick circuit means automatically rendered ineffective by the passage of a train for maintaining said code sending relay energized after initial energization thereof until the train has entered the next block ahead, and means responsive to the energization of either said repeated relay or said code sending relay at the exit end of a block for rendering the associated transmitter relay effective to transmit driven code pulses.

25. In a normally inactive coded track circuit automatic block signal system for a series of consecutive blocks, a code transmitter relay and a normally deenergized track relay for the exit end of each block, means responsive to the intermittent operation of said track relay of a block by current pulses from the entrance end of that block for rendering the associated transmitter relay effective to transmit driven code pulses at a selected code rate, a code sending relay initially energized by cessation of such intermittent operation of said track relay for also rendering the associated code transmitting relay effective to transmit driven code pulses, and means automatically rendered ineffective by the passage of a train for maintaining said code sending relay energized after initial energization thereof until a train has passed into the next block ahead.

26. A coded track circuit system for a series of blocks comprising, a coded track circuit for each block normally deenergized until automatically set into operation by the approach of a train, said coded track circuit including code transmitting means at each end of the block operable at times to transmit signal control driven code pulses toward the entrance end of the block and inverse code pulses toward the exit end, a code sending relay for the exit end of each block acting when energized to render the associated code transmitting means effective to transmit signal control driven code pulses of a selected code rate, means at the exit end of each block responsive to the reception and subsequent cessation of inverse code pulses for initially energizing said code sending relay, and means for maintaining said code sending relay energized until it is automatically restored to its normal condition by the passage of a train.

27. An automatic block signal system for a series of consecutive blocks comprising, a coded track circuit for each block normally inactive and deenergized until set into coding operation by the approach of a train, a code sending stick relay for the exit end of each block operable when energized to maintain coding operation of the associated track circuits, means responsive to the presence of a train for automatically causing initial energization of the code sending stick relays for a plurality of blocks ahead of such train, a code responsive relay for the entrance end of each block energized by the reception of driven code at any code rate, a stick circuit for maintaining each code sending relay energized, and means including said code responsive relay of a given block for temporarily opening the stick circuit of the code sending relay for the next block in the rear when the passage of a train causes release of said code responsive relay.

28. In an automatic block signal system for a stretch of track divided into blocks and signalled for train movement in one direction only, a color light signal at the entrance end to each block governing train movement in the same direction, a coded track circuit for each block normally inactive and leaving the track rails deenergized when no train is approaching within a limited distance, each of said coded track circuits being operable when set in operation to transmit over the track rails signal control driven code pulses of a selected code rate in one direction and at times inverse code pulses in the opposite direction, an inverse code responsive relay and a code sending relay for the exit end of each block, means including said code sending relay and said inverse code responsive relay for the several blocks and cooperating to initiate coding operation in a predetermined number of blocks ahead of a train moving through the stretch, and approach lighting means for each signal governed by the associated code sending relay, whereby said signals which are normally not lighted while the coded track circuits are deenergized are approach lighted when coding operation of said track circuits has been initiated by an approaching train.

29. A coded track circuit automatic block signal system comprising, a stretch of track divided into blocks each having a coded track circuit, said coded track circuits being normally inactive and leaving the track rails deenergized until set into operation by an approaching train, approach starting means for the several blocks including code controlling means for each block and cooperating to automatically initiate coding operation of said track circuits for a plurality of blocks ahead of a train moving through the stretch, means for automatically restoring said coded track circuits to their normal condition behind such train, and other means associated with certain signal locations for also operating said code controlling means for said blocks to provide emergency starting of the coded track circuits of blocks ahead in the event of failure of said approach starting means.

30. In a coded track circuit automatic block signalling system of the character described, a series of consecutive blocks each having a coded track circuit normally inactive and leaving the track rails deenergized until set into operation by an approaching train, approach starting means associated with the several blocks and responsive to the movement of a train into track circuits in coding operation for automatically initiating coding operation of track circuits for a plurality of blocks ahead of such train, means for restoring said track circuits to their normal condition behind a train as it moves through the stretch, and means operable occasionally to detect the presence of a train in an inactive track circuit for also automatically initiating coding operation of track circuits in blocks ahead of an inactive track circuit actually occupied by a train, thereby providing emergency starting control ahead of a train entering an inactive track circuit in the event of failure of the approach starting means to set that track circuit into operation.

31. An automatic block signal system for multiple track railroads having a series of blocks, a coded track circuit for each block normally inactive and deenergized, a code sending relay for the exit end of each block operable when energized to provide an energization of the next block in advance to automatically initiate coding operation thereof, approach starting means for the several blocks cooperating to energize the code sending relays for a plurality of blocks ahead of a train travelling through the stretch, means responsive to the passage of a train for automatically restoring said code sending relays to their normal condition behind a train, and emergency starting means operating at intervals to detect the presence of a train in an inactive track circuit and acting to energize the associated code sending relay if such inactive track circuit is actually occupied by a train.

32. In an automatic block signal system of the type described, a stretch of track divided into a series of blocks each having a normally deenergized coded track circuit, means for the several blocks cooperating to initiate coding operation in a plurality of blocks ahead of a train moving through such stretch, means responsive to the passage of the train for restoring said coded track circuits to their normal condition behind a train, a source of current and a series relay for the exit end of each block, a normally deenergized transmitter relay acting when energized to connect said source of current and said relay in series across the track rails of the associated block to permit energization of said series relay if a train is present, emergency starting means including a constantly operating device for occasionally at long intervals energizing for a short time a transmitter relay of a block if then inactive to detect occupancy thereof, and means responsive to the energization of a series relay of a block for rendering effective the approach starting means for blocks ahead.

33. In an automatic block signal system for a stretch of track provided with blocks and signalled for train movement in one direction only, a coded track circuit for each block normally inactive and deenergized and set into operation by an approaching train, a source of current and a series relay for the exit end of each block, a transmitter relay for connecting said source of current and said series relay in series across the track rails of a block to detect the presence of a train, means including said series relay for the several blocks cooperating to automatically initiate coding operation of the track circuits for a plurality of blocks ahead of a block having its series relay energized, and constantly operating emergency starting means for temporarily energizing said transmitter relays occasionally at long time intervals to detect the presence of a train in an inactive track circuit and provide approach starting control for blocks ahead in the event of failure of said approach starting means.

34. In an automatic block signal system of the type described comprising, a series of consecutive blocks each having a normally inactive and deenergized coded track circuit, a series relay for the exit end of each block, a normally deenergized transmitter relay operable when energized to connect said series relay in series with a source of current across the track rails of the associated block, code sending means for the exit end of each block automatically operated by an approaching train for causing operation of the associated transmitter relay at a selected code rate, said code sending means including circuit means for initiating coding operation in the next block ahead, means responsive to the energization of a series relay for also operating the associated code sending means, and emergency starting means for temporarily energizing said transmitter relays occasionally at long time intervals only if the associated code sending means is not then operating.

35. In an automatic block signal system having normally deenergized coded track circuits for the several blocks of a stretch of track, a series relay, a normally deenergized transmitter relay, code sending means for the exit end of each block automatically set into operation by an approaching train and restored to normal behind such train for operating the associated transmitter relay at a code rate dependent upon traffic conditions, and other means including a constantly operating chopper for temporarily energizing said transmitter relays occasionally at long intervals provided said code sending means is not then operated, and means governed by the energization of a series relay due to the presence of a train for actuating the associated code sending means.

36. In a coded track circuit automatic block signal system of the type described, the combination with a plurality of normally inactive and deenergized code track circuits, of a code sending stick relay associated with the exit end of each track circuit for causing the coding operation thereof, approach starting means for the several track circuits cooperating to energize the code sending stick relays for a predetermined limited number of blocks ahead of the train, said starting means including apparatus for providing a starting energization of the entrance end of a track circuit when the code sending relay for the next track circuit in the rear is energized, stick circuit means for maintaining each code sending relay energized until automatically restored by the passage of a train, and manually operable means for energizing each code sending relay, whereby coding operation of inactive track circuits ahead of a train may be set up by said manual control in the event of failure of the train governed automatic approach starting means.

37. In an automatic block signal system for a stretch of double track provided with blocks and having a predetermined entrance point at which trains may enter said stretch, a normally inactive and deenergized coded track circuit for each block, said coded track circuits when set into operation being operable to provide signal control driven codes of a selected code rate in one direction toward the entrance ends of the blocks and at times inverse codes in the opposite direction, approach starting means for the several blocks cooperating to automatically initiate the coding operation of said track circuits of a plurality of blocks, said approach starting means being governed by the application and cessation of inverse code to extend the automatic starting control over successive blocks, and means associated with said entrance point to the stretch for initiating coding operation in the first block and for governing transmission of inverse code in that block to extend the approach starting control for a plurality of blocks until the highest code rate is received.

38. In a coded track circuit system for a stretch of track divided into blocks comprising and having a predetermined entrance point for trains, a normally deenergized coded track circuit for each block, said coded track circuits when set into operation being operable to provide signal control driven codes of a selected code rate in one direction and at times inverse codes in the opposite direction, approach starting means including inverse code response means for the several blocks for initiating coding operation in a plurality of successive blocks in turn until a sustained inverse code is received in the remote block, and means at said entrance point for initiating coding operation in the first block of the stretch and preventing the transmission of inverse code in said first block until the highest code rate is transmitted in that block.

39. In an automatic block signal system for multiple track railroads comprising, a series of blocks each having normally inactive code transmitting means leaving the track rails of the blocks deenergized and normally inactive electrically operable code oscillators for intermittently closing coding contacts at different code rates, each of said track circuits including means at the entrance end for transmitting driven or inverse code pulses toward the exit end, means associated with the several blocks and cooperating in response to the application and removal of driven or inverse code pulses toward the exit end of that block to energize the code oscillators and initiate operation of the code transmitting means at the exit ends of a predetermined limited number of blocks ahead of a train moving through the stretch, and means for restoring said code transmitting means and code oscillators to their normal inactive condition behind such train.

NEIL D. PRESTON.

REFERENCES CITED

The following references are of record in the file of this patent:

UNITED STATES PATENTS

| Number | Name | Date |
|---|---|---|
| 2,351,540 | Pelikan | June 13, 1944 |
| 2,353,421 | Staples | July 11, 1944 |
| 2,360,948 | Jerome | Oct. 24, 1944 |
| 2,519,979 | Preston | Aug. 22, 1950 |
| 2,522,892 | Preston | Sept. 19, 1950 |